United States Patent
Srinivasan et al.

(10) Patent No.: US 11,200,538 B2
(45) Date of Patent: Dec. 14, 2021

(54) SYSTEM AND METHOD FOR A UNIFIED INCIDENT MANAGEMENT INTERFACE

(71) Applicant: ServiceNow, Inc., Santa Clara, CA (US)

(72) Inventors: Sheeba Srinivasan, Atlanta, GA (US); Valencio Cardoso, San Diego, CA (US); Aditya Mallik Manthripragada, Hyderabad (IN); Soumya Mitra, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 287 days.

(21) Appl. No.: 16/047,885

(22) Filed: Jul. 27, 2018

(65) Prior Publication Data
US 2019/0266064 A1    Aug. 29, 2019

Related U.S. Application Data

(60) Provisional application No. 62/635,816, filed on Feb. 27, 2018.

(51) Int. Cl.
*G06Q 10/10*    (2012.01)

(52) U.S. Cl.
CPC .................... *G06Q 10/10* (2013.01)

(58) Field of Classification Search
USPC ....................................................... 705/7.15
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 6,996,601 B1 * | 2/2006 | Smith ............... G06Q 10/06 709/203 |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |

(Continued)

FOREIGN PATENT DOCUMENTS

WO    WO 2017046549 A1 *    3/2017

OTHER PUBLICATIONS

Taskbar, Wikipedia, archives org Sep. 20, 2017 https://web.archive.org/web/20170701000000*/https://en.wikipedia.org/wiki/Taskbar (Year: 2017).*

(Continued)

*Primary Examiner* — Octavian Rotaru
(74) *Attorney, Agent, or Firm* — Fletcher Yoder PC

(57) ABSTRACT

An incident management interface enables an operator to track progress in resolving an incident and includes a first, second, and third selectable feature. The first selectable feature presents a summary of at least effects of the incident and resolution activity, the second selectable feature enables the operator to create, edit, and administer one or more communication tasks associated with one or more client devices, and the third selectable feature enables the operator to manage one or more conference calls with a variety of agents. The first selectable feature, the second selectable feature, and the third selectable feature are each selectable from a screen of the unified incident management interface.

17 Claims, 19 Drawing Sheets

(56) References Cited

U.S. PATENT DOCUMENTS

| | | | |
|---|---|---|---|
| 7,225,139 B1* | 5/2007 | Tidwell | G06Q 10/10 |
| | | | 705/7.15 |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 8,904,306 B1* | 12/2014 | Whitney | G06F 3/04883 |
| | | | 715/786 |
| 9,123,009 B1* | 9/2015 | Etter | G06Q 10/063116 |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 9,818,729 B1 | 11/2017 | Moon | |
| 9,936,066 B1* | 4/2018 | Mammen | G10L 15/26 |
| 2004/0066407 A1* | 4/2004 | Regan | G09G 5/14 |
| | | | 715/764 |
| 2006/0229902 A1* | 10/2006 | McGovern | G06Q 50/10 |
| | | | 705/321 |
| 2007/0198330 A1* | 8/2007 | Korenblit | G06Q 10/06393 |
| | | | 705/7.42 |
| 2008/0165944 A1* | 7/2008 | Rosenthal | H04M 3/56 |
| | | | 379/202.01 |
| 2010/0246800 A1* | 9/2010 | Geppert | H04W 4/21 |
| | | | 379/265.09 |
| 2012/0191704 A1* | 7/2012 | Jones | G06F 16/26 |
| | | | 707/722 |
| 2013/0198609 A1* | 8/2013 | Mokhtarzada | G06F 3/0481 |
| | | | 715/234 |
| 2014/0033076 A1* | 1/2014 | Al-Alami | G06F 3/0483 |
| | | | 715/753 |
| 2014/0307863 A1* | 10/2014 | Snyder | H04M 3/42068 |
| | | | 379/265.09 |
| 2015/0200879 A1* | 7/2015 | Wu | H04L 51/046 |
| | | | 715/758 |
| 2015/0347950 A1* | 12/2015 | Goyal | G06Q 10/06393 |
| | | | 705/7.39 |
| 2016/0036652 A1* | 2/2016 | Bellini, III | G06F 9/44 |
| | | | 709/223 |
| 2018/0309801 A1* | 10/2018 | Rathod | H04L 67/141 |
| 2018/0337968 A1* | 11/2018 | Faulkner | H04L 12/1813 |
| 2019/0026686 A1* | 1/2019 | Ryals | G06Q 10/087 |
| 2019/0130413 A1* | 5/2019 | Nelson | G06F 16/248 |

OTHER PUBLICATIONS

LiveHelpNow Live Chat, livehelpnow channel, excerpt, Aug. 16, 2013 (Year: 2013) https://www.youtube.com/watch?v=l3Qtwkbvr4c.*

LiveHelpNow Call Management, livehelpnow channel, youtube Aug. 16, 2013 (Year: 2013) https://www.youtube.com/watch?v=Nf1xBGY2rqc.*

* cited by examiner

1 Impacted Service [Add]

| Name | Enterprise criticality | Owned by |
|---|---|---|
| Dealer Portal | 1 - Most critical | James Greene |

6 Affected CIs [Add]

| Name | Support Group | Owned by |
|---|---|---|
| DP WEB14 | Sec ops | John James |
| DP WEB42 | Net ops | Diana Miles |
| DP WEB04 | Net ops | John Johnson |
| DP WEB02 | Data ops | Rene Roaps |

View all

1 Outages [Create]

| Configuration Item | Type | Begin | End |
|---|---|---|---|
| Email | Outage | 2018-04-25 02:21:00 | 2018-05-04 19:56:06 |

1 Affected Locations [Add]

| Name | City | Country |
|---|---|---|
| 18 iLabs Center, Building 3, Inorbit M... | Hyderabad | India |

2 Child Incidents [Create]

| Number | Short Description | Add / Manage |
|---|---|---|
| INC0010194 | Inbound emails are not getting processed | James Smith |
| INC0010193 | Approvals not processed for Change re... | |

1 Incident Tasks [Create]

| Number | Short description | Assigned to |
|---|---|---|
| TASK0020746 | Investigation Task | ITIL User |

*FIG. 8*

| 1 Impacted Service | | | | | 6 Affected CIs | | | Add |
|---|---|---|---|---|---|---|---|---|
| Name | Enterprise criticality | Owned by | | | Name | Support Group | Owned by | |
| Dealer Portal | 1 - Most critical | James Greene | | | DP WEB14 | Sec ops | John James | |
| | | | | | DP WEB42 | Net ops | Diana Miles | |
| | | | | | DP WEB04 | Net ops | John Johnson | |
| | | | | | DP WEB02 | Data ops | Rene Roaps | |
| | | | | | View all | | | |
| 4 Outages | | | Create | Add | 3 Affected Locations | | | |
| Configuration Item | Type | Begin | End | | Name | City | Country | |
| EXASUM01 | Outage | 05-Jan-18 19:53:39 | 05-Jan-18 22:58:18 | | 100 South Charles Street | Manama | Bahrain | |
| ISACS01 | Outage | 05-Jan-18 00:12:32 | 05-Jan-18 23:57:29 | | 10799 West Alameda Ave. | Madrid | Spain | |
| DNS01 | Outage | 05-Jan-18 20:29:26 | 05-Jan-18 00:19:32 | | 101 Broadway East | Dubai | United Arab Emirates | |
| COLLAB01 | Outage | 05-Jan-18 23:45:00 | 05-Jan-18 00:19:32 | | | | | |
| 3 Child Incidents | | | Create | Add | 7 Incident Tasks | | | Create Add |
| Number | Short Description | | Caller | | Number | Short Description | | Assigned to |
| INC0000007 | Manager can't access EMEA Dealer port... | | James Smith | | TSK001001 | Run network diagnostics | | Eva Johnson |
| INC0000051 | Incoming reports mentioning dealer port... | | James Smith | | TSK001023 | Review and update NOC team o... | | Lee Smith |
| INC0000053 | SAP Financial Dealer Portal application ... | | Thomas King | | TSK001020 | Create patch to resolve server is... | | Eva Johnson |

*FIG. 9*

Communications Tasks — 258 | All ◆ Add

Technical Communication 1/3 Tasks completed

○ Initial Technical Update
  Channels: Email, SMS
  Status: Completed
  Description: Send this notification update to all technical stakeholders immediately once the...

○ Technical Status Update                     Due in 25:23  [Send Overdue]  [...]
  Channels: Email, SMS                              392
  Status: Not Started
  Description: Send this notification update to all technical stakeholders every 30 minutes to k...

○ Technical Resolution Update                 Overdue  [Send Overdue]  [...]
  Channels: Email, SMS
  Status: Not Started
  Description: Send this notification update to all technical stakeholders once the incident has...

Enterprise communication 1/2 Tasks completed

○ Initial Enterprise Update
  Channels: Email, SMS
  Status: Completed
  Description: Send this notification update to all technical stakeholders immediately once the...

○ Enterprise Status Update                    Due in 29:59  [Send Overdue]  [...]
  Channels: Email, SMS                              392
  Status: Not Started
  Description: Send this notification update to all technical stakeholders immediately once the...

Groups — 260                    Active | On call Groups — 342

Network EMEA  [🔍]

Davis Johnson
 Nina Smith
 Alexander Ring

Work Notes & Activity

Major Incident
Technical
Enterprise

*FIG. 11*

Add Communication Task — 402

* Communication Plan — 404: New
* Plan Name: Executive Team Communication

Add Recipients — 406: User
* Recipient List — 408: John Doe [Add]
[×]

* Task Name — 410: Executive Team Status Updates
Task Description — 412: Send this notification update to all enterprise stakeholders every 30 minutes to keep them updated on tho w the incidents progress.

* Channels — 384:
☐ Email
☐ SMS
☐ Slack
☐ Announcements

Frequency — 416:
○ One time
○ Recurring
[30] Minutes

[Cancel] [Save]

| 1 Outages | | |
|---|---|---|
| Configuration Item<br>Email | Type<br>Outage | Begin<br>2018-04-25 02:21:00 | End<br>2018-05-04 19:56:06 |

| 1 Affected Location | | |
|---|---|---|
| Name<br>18 iLabs Center, Building 3 | | City<br>Alexandria | Country<br>USA |

Resolution

| Resolution notes |
|---|
| Service has been restored. The event occurred on April 25th at 02:21 PST. Inbound email began processing on April 25th at 10:07AM PST. During this time, it is possible you did not receive emails in your instance. |

| 0 Related Problems | | |
|---|---|---|
| Number | Short description | Assigned to |

0 Related Change Requests

| 0 Related Problems | | |
|---|---|---|
| Number | Short description | Effort Estimate | CIM Coordinator |

Timeline

INC0010188 . Work notes
2018-04-25 17:02:20 (UTC) . Mayor Incident Manager
Rolled back the changes, which resume email delivery INC0010188 . Work notes
2018-04-25 16:54:07 (UTC) . Mayor Incident Manager
Engineers determined that instances email configurations appeared correct and instances were successfully connecting to the email server.

INC0010188 . Work notes
2018-04-25 16:53:51 (UTC) . Mayor Incident Manager
An issue with the email infrastructure is the most probable cause.

SYSTEM AND METHOD FOR A UNIFIED INCIDENT MANAGEMENT INTERFACE

CROSS-REFERENCE TO RELATED APPLICATIONS

This application claims priority to U.S. Provisional Application No. 62/635,816, entitled "SYSTEM AND METHOD FOR A UNIFIED INCIDENT MANAGEMENT INTERFACE," filed Feb. 27, 2018, the disclosure of which is herein incorporated by reference in its entirety for all purposes.

BACKGROUND

This section is intended to introduce the reader to various aspects of art that may be related to aspects of the present disclosure, which are described and/or claimed below. This discussion is believed to be helpful in providing the reader with background information to facilitate a better understanding of the present disclosure. Accordingly, it should be understood that these statements are to be read in this light, and not as admissions of prior art.

Individuals, enterprises, and other organizations may utilize software resources, via multiple devices connected to a network, to conduct activities or otherwise run an organization. Set up, expansion, maintenance, and normal use of such systems may give rise to incidents that a client may not have the expertise to resolve on his or her own. For example, service outages or other service disruptions may constitute incidents needing resolution for the continued or optimal operation of a client, and in some instances, these service outages may result in significant disruption to the enterprise requiring a response beyond the routine incident management process. In such cases, an operator, such as a customer support personnel or service desk agent, may facilitate quickly and efficiently resolving the incident. Such operations may involve a variety of different activities and teams of customer support personnel, the coordination of which may be difficult to implement in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques generally relate to system and technique implemented to facilitate incident management and resolution. Disclosed herein is a unified incident management window that presents a support personnel (e.g., a technical personnel trained to manage incidents, such as major incidents) with a variety of selectable features each selectable from a screen of the unified incident management interface. In particular, the unified incident management window includes a first selectable feature that presents a summary of at least effects of the incident and resolution activity, a second selectable feature that enables the operator to create, edit, and administer one or more communication tasks associated with one or more client devices to impacted users, impacted enterprise personnel, stakeholders, etc., a third selectable feature that enables the operator to manage one or more conference calls with many of agents, and a fourth selectable feature that enables the operator to manage a post-incident report associated with the incident and resolution activity.

BRIEF DESCRIPTION OF THE DRAWINGS

The description herein makes reference to the accompanying drawings, wherein like reference numerals refer to like parts throughout the several views.

FIG. 8 is an embodiment of another portion of the unified incident management window of FIG. 5 when the summary feature of FIG. 7 is selected, in accordance with aspects of the present approach;

FIG. 9 is an embodiment of a portion of the unified incident management window of FIG. 5, whereby the incident of FIG. 4 is marked as a major incident in accordance with aspects of the present approach;

FIG. 11 is an embodiment of a portion of the unified incident management window of FIG. 5 when a communications feature is selected, in accordance with aspects of the present approach;

FIG. 12 is an embodiment of a portion of the unified incident management window of FIG. 5, whereby a communication task is added to the communications feature of FIG. 11, in accordance with aspects of the present approach;

FIG. 16 is an embodiment of a portion of the unified incident management window of FIG. 5 whereby the conference call of FIG. 15 is administered and managed, in accordance with aspects of the present approach;

FIG. 17C is an embodiment of a post-incident report window of FIG. 17A, in accordance with aspects of the present approach; and FIG. 17D is an embodiment of a post-incident report window of FIG. 17A, in accordance with aspects of the present approach.

DETAILED DESCRIPTION OF SPECIFIC EMBODIMENTS

Figure 1:
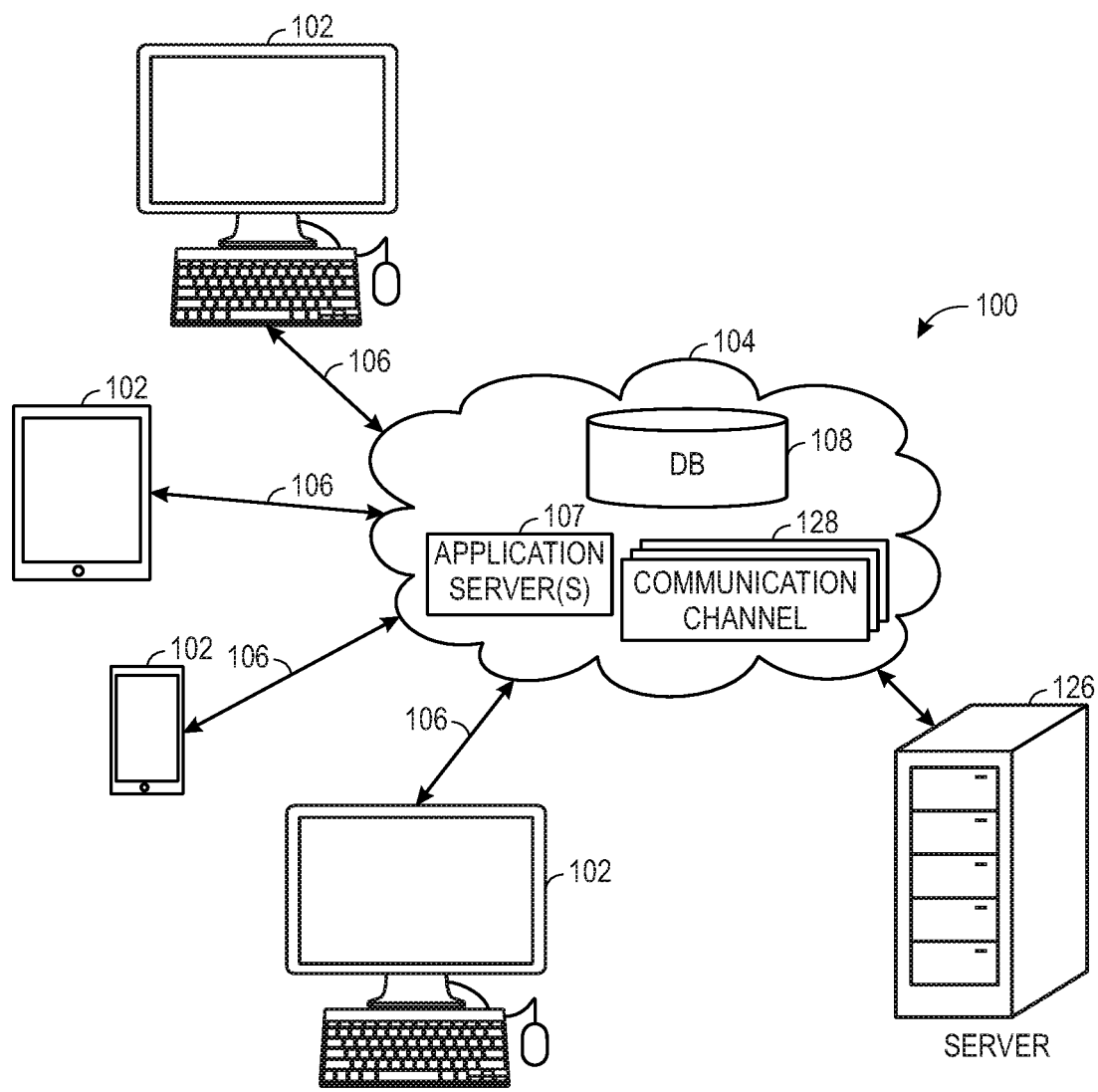
FIG. 1 is a block diagram of an embodiment of a distributed computing system utilizing a platform and a database (DB), in accordance with aspects of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) is increasingly important in a world in which enterprises and other organizations utilize computers and implement software to conduct operations and help run their organizations. Set up, expansion, maintenance, and normal use of such systems may give rise to incidents (e.g., incidents) that a client may not have the expertise to resolve on his or her own. This results in reduced efficiency or service outages until such incidents are remedied. Accordingly, it is desirable for an issue to get resolved as quickly and efficiently as possible, which may result in an operator, such as a support personnel, getting involved. Coordinating the activities needed for incident resolution may be complex and may involve a significant amount of resources and/or resources or different types, and may require that the incident go through a specific process before the incident is resolved.

For example, after a client experiences a hardware or software related issue, such as email outages, the client may submit a request to resolve the major incident, such as by sending a notification regarding the incident to support personnel or by contacting the support personnel. The support personnel may receive these notifications requesting help in resolving the incident and may promote the incident to a major incident to initiate a major incident evaluation or resolution process in response. As used herein, a "major incident" refers to an incident that may result in significant disruption to an enterprise and may require a response beyond the routine incident management process, for example, because many aspects of the enterprise have been disrupted, because an important aspect (e.g., email, portal access, etc.) of the enterprise has been affected, and/or the like. A major incident may be given more importance and priority in being resolved when compared to an incident because the major incident may be determined as having a more disruptive effect on the enterprise as a whole. With this in mind, initially, the incident submitted by a user may be characterized as a major incident "candidate," such that the request to resolve the incident may be pending or otherwise under consideration for promotion from a major incident candidate to a major incident. After the support personnel promote the major incident candidate to a major incident, the support personnel may begin the process of resolving the major incident. Such an incident resolution process may involve holding conference calls with technical personnel, communicating notifications and updates to the client, stakeholders, IT executives, impacted users of the system in question, and so forth. In addition, the support personnel may update the summary of the major incident and update a post-incident report when the major incident is determined to be "resolved." Typically, viewing a summary of the major incident, holding one or more conference calls with technical or other personnel to resolve the major incident, administering and editing communications with the clients and/or public (e.g., impacted users or groups) associated with the major incident, and viewing the post-incident report of the major incident when it has been resolved may involve accessing and/or utilizing a variety of different applications or systems.

Accordingly, the support personnel may have to coordinate and navigate a variety of different applications, interfaces, systems, and so forth to respond to a given incident and/or major incident. For example, the support personnel may have to open, close, and navigate between applications and/or systems depending on whether they want to view an incident summary, update communications being generated to the client and/or public, initiate or manage one or more conference calls, update a post incident report, and the like. While the discussion herein focuses on support personnel working to resolve an incident, in some embodiments there may be a hierarchy of support personnel, each of which are involved at various stages in the incident resolution process. For example, a service desk agent may review incidents, and a major incident manager may promote the major incident candidate to a major incident and resolve it to efficiently handle the various aspects of the process for resolving a major incident.

By employing the systems and techniques used herein, support personnel may work more efficiently to resolve an incident by using a unified incident management interface that enables the support personnel to promote a major incident candidate to a major incident up until the major incident is resolved. Furthermore, using the systems and techniques described herein, the support personnel may promote a major incident candidate to a major incident, examine a summary of the major incident, hold conference calls with other personnel to resolve the major incident, view previous communication with clients (e.g., users) associated with the major incident, and edit the post-incident report of the incident when the major incident has been resolved.

The preceding overview is provided to enable a basic or general understanding of various aspects of the non-limiting embodiments that follow and the accompanying drawings. This overview is not intended as an exhaustive or complete description. Instead, the purpose of this overview is to introduce some concepts of this disclosure as a prelude to the following more detailed descriptions of the various embodiments With the preceding in mind, the following figures relate to various types of generalized system architectures or configurations that may be employed to provide services to a client in a distributed computing framework that in turn might be subject to incidents or outages as discussed herein. Correspondingly, these system and platform examples may also relate to systems and platforms on which the techniques discussed herein may be implemented to facilitate incident resolution. With this in mind, FIG. 1 is a block diagram of a system 100 that utilizes distributed computing and that may be used in conjunction with the approaches discussed herein for providing customer service. As illustrated, one or more clients 102 communicate with a platform 104 (e.g., a cloud service) over a communication channel 106. Each client 102 may include any suitable computing system, such as a mobile phone, a tablet computer, a laptop computer, a notebook computer, a desktop computer, or any other suitable computing device or combination of computing devices. Each client 102 may include client application programs running on the computing devices.

The platform 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication protocols and mechanisms for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only four clients 102 are shown connected to the platform 104 in the depicted example, it should be noted that platform 104 may connect to any number of clients (e.g., tens, hundreds, thousands, or tens of thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The DB 108 includes a series of tables containing information used by applications utilized or run by the clients 102. Additional to or in place of the DB 108, the platform 104 may include one or more other database servers. The database servers are configured to store, manage, or otherwise provide data for delivering services to the client 102 over the communication channel 106. The database server includes one or more databases (e.g., DB 108) that are accessible by the application server 107, the client 102, and/or other devices external to the databases. In some embodiments, more than a single database server may be utilized. Furthermore, in some embodiments, the platform 104 may have access to one or more databases external to the platform 104 entirely.

Access to the platform 104 is enabled by a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

Figure 2:
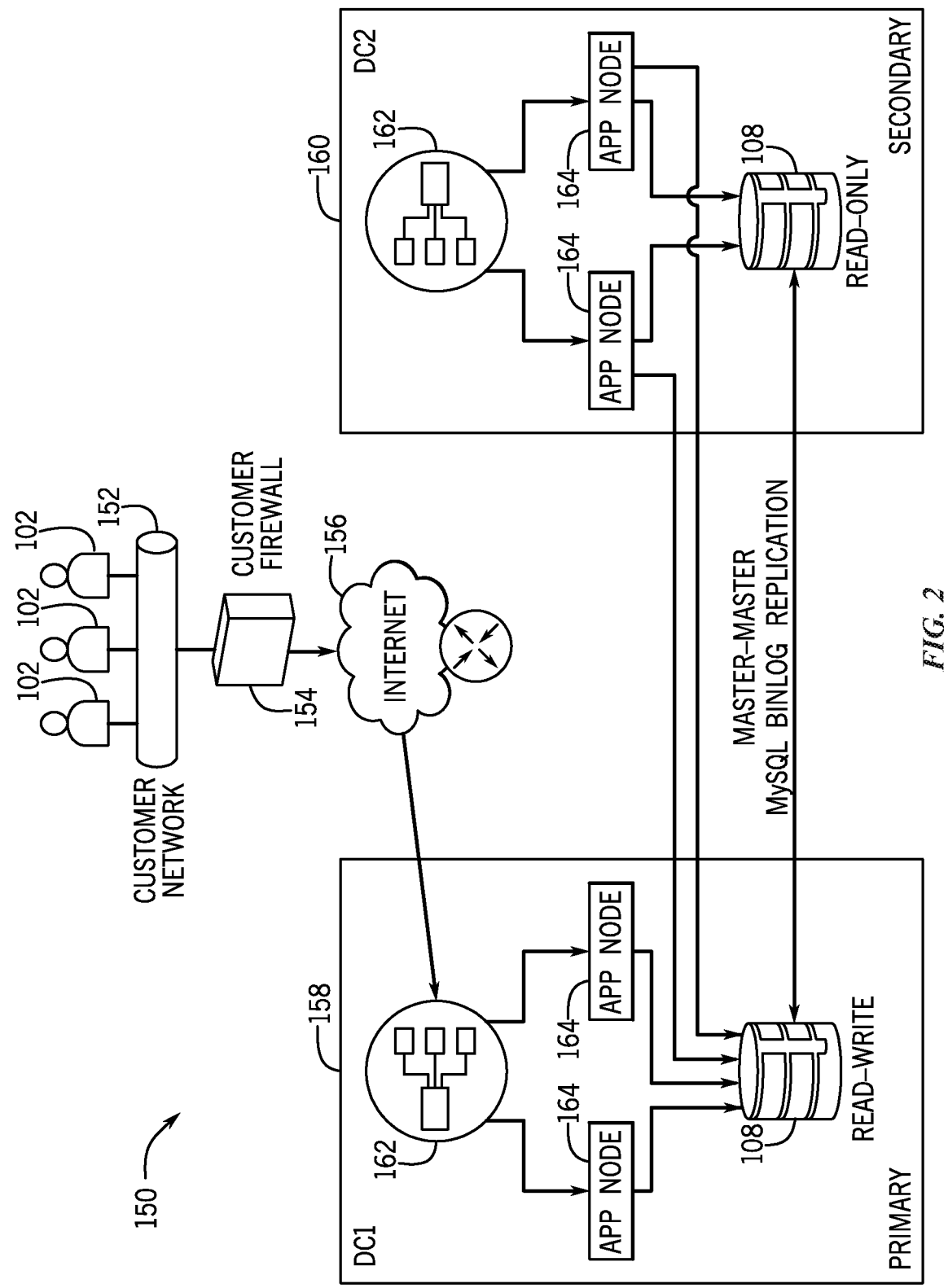
FIG. 2 is a schematic of an embodiment of a multi-instance architecture that may be utilized by the distributed computing system of FIG. 1, in accordance with aspects of the present approach.

FIG. 2 is a schematic of an embodiment of a multi-instance architecture 150 that may be utilized by the distributed computing system 100 of FIG. 1. As shown, one or more clients 102 are connected to a customer network 152, which may or may not be protected by a firewall 154. The one or more clients 102 may access first and second virtual machines 158, 160 via the Internet 156. In the illustrated embodiment, the first virtual machine 158 is a primary virtual machine 158 and the second virtual machine 160 is a secondary virtual machine. The primary and secondary virtual machines 158, 160 are disposed in different data centers. Other embodiments may include more than two virtual machines (e.g., multiple secondary virtual machines). As shown, each of the virtual machines 158, 160 includes at least one load balancer 162, multiple application nodes 164, and a DB 108. In the illustrated embodiment, the database 108 of the primary virtual machine 158 is read-write and the database 108 of the secondary virtual machine 160 is read-only. The databases 108 are replicated via MySQL binlog replication for near real-time replication between the primary database 108 and the secondary database 108. As shown, the application nodes 164 of the primary virtual machine 158 may access the primary database 108, while the applications nodes 164 of the secondary virtual machine 160 may access both the primary database 108 and the secondary database.

Each customer may have its own dedicated virtual machines 158, 160 and database processes. The multi-instance architecture 150 results in full instance redundancy for all production instances with near real-time replication and no comingling of data between customers. By providing customers with their own database(s) 108, customers are isolated from database maintenance and/or database failure of other customers. In some embodiments, a client may pull data from multiple different databases 108 distributed over multiple virtual machines 158 and/or data centers. The pulled data may then be combined and used as inputs to perform a task.

Figure 3:
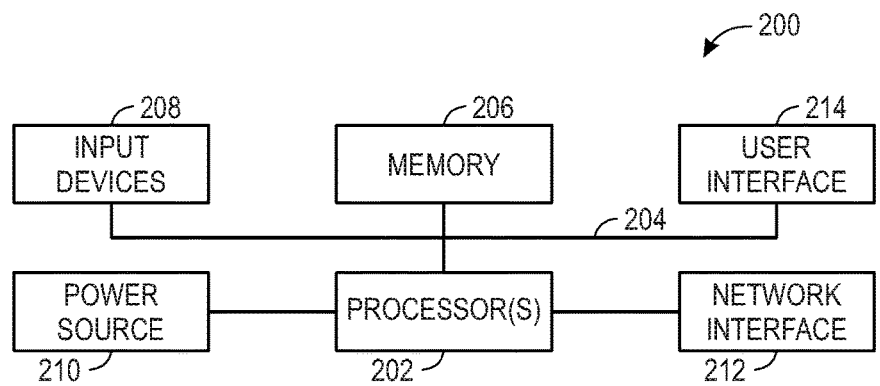
FIG. 3 is a block diagram of an embodiment of a computing device utilized in the distributed computing system of FIG. 1, in accordance with aspects of the present approach.

FIG. 3 generally illustrates a block diagram of an embodiment of an internal configuration of a computing device 200. With respect to FIGS. 1-3, the computing device 200 may be an embodiment of the client 102, the application server 107, a virtual machine 158, 160, a database server (e.g., DB 108), other servers in the platform 104 (e.g., server hosting the communication channel 128), and/or a device running the server 126. These devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein with or without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly-accessible memory (RAM), disk drives, solid state drives, external flash memory, or any combination thereof. Although shown as a single block in FIG. 3, the memory 206 can be implemented using multiple physical units in one or more physical locations. The one or more processors 202 access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may also monitor operating conditions (e.g., temperatures) of various components of the computing device 200, such as the one or more processors 202, which may be relevant in incident evaluations or resolutions as discussed herein.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired and/or wireless network interface. Moreover, the computing device 200 may communicate with other devices via the network interface 212 using one or more network protocol.

A user interface 214 may include a display that is configured to display images transferred to it from the one or more processors 202. In addition to and/or alternative to the display, the user interface 214 may include other devices for interfacing with a user or client. For example, the user interface 214 may include lights (e.g., LEDs), speakers, haptic feedback, and the like.

As discussed herein, the device and architectures described above may constitute platforms or systems on which an incident (e.g., service outage or other issue) and/or incident resolution process may occur.

Figure 4:
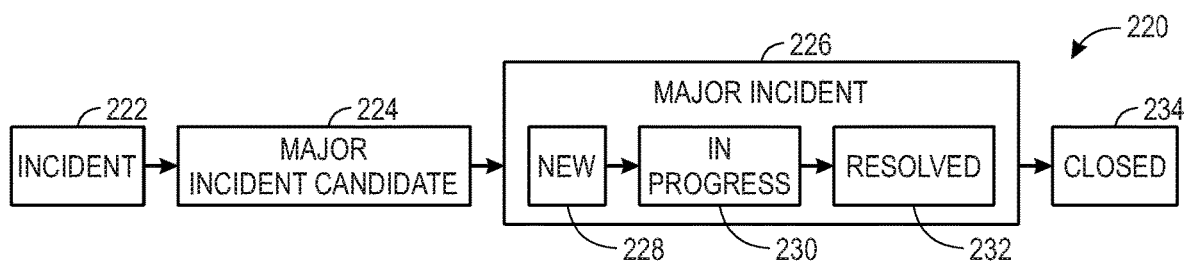
FIG. 4 is a flow diagram of an embodiment of the various states used to identify an incident until the incident is marked as resolved and closed, in accordance with aspects of the present approach.

With the preceding in mind, FIG. 4 is a flow diagram 220 of the various states of an incident 222 until the incident 222 is marked as resolved and closed. In this example, a client (e.g., user) may experience a hardware or software-related issue, such as a service outage or other incident impacting their use of an application, a database, a communication channel, and so forth. The client may submit an incident 222 requiring servicing. When the incident 222 is received by a support personnel, the incident 222 is initially characterized as a major incident candidate 224 in the depicted flow. The support personnel may, upon review, evaluation, and/or confirmation of the existence and/or severity of the incident and promote the major incident candidate 224 to a major incident 226 (e.g., active incident). One or more support personnel may work toward resolving the major incident 226. In some embodiments, when the major incident candidate 224 is initially promoted to a major incident 226, the major incident 226 may exist as a new 228 major incident 226 in the server 126. While the support personnel work toward resolving the major incident 226, the major incident may exist as a major incident 226 that is in progress 230. After the major incident 226 is resolved, the major incident 226 may be designated as a resolved 232 major incident 226. In some instances, after the user is satisfied with the resolution, the major incident 226 may be marked as closed 234. The support personnel (s) may engage with a unified incident management window, as described herein, before, during, and after resolving the incident 222 to facilitate resolution of the incident 222.

Figure 5:
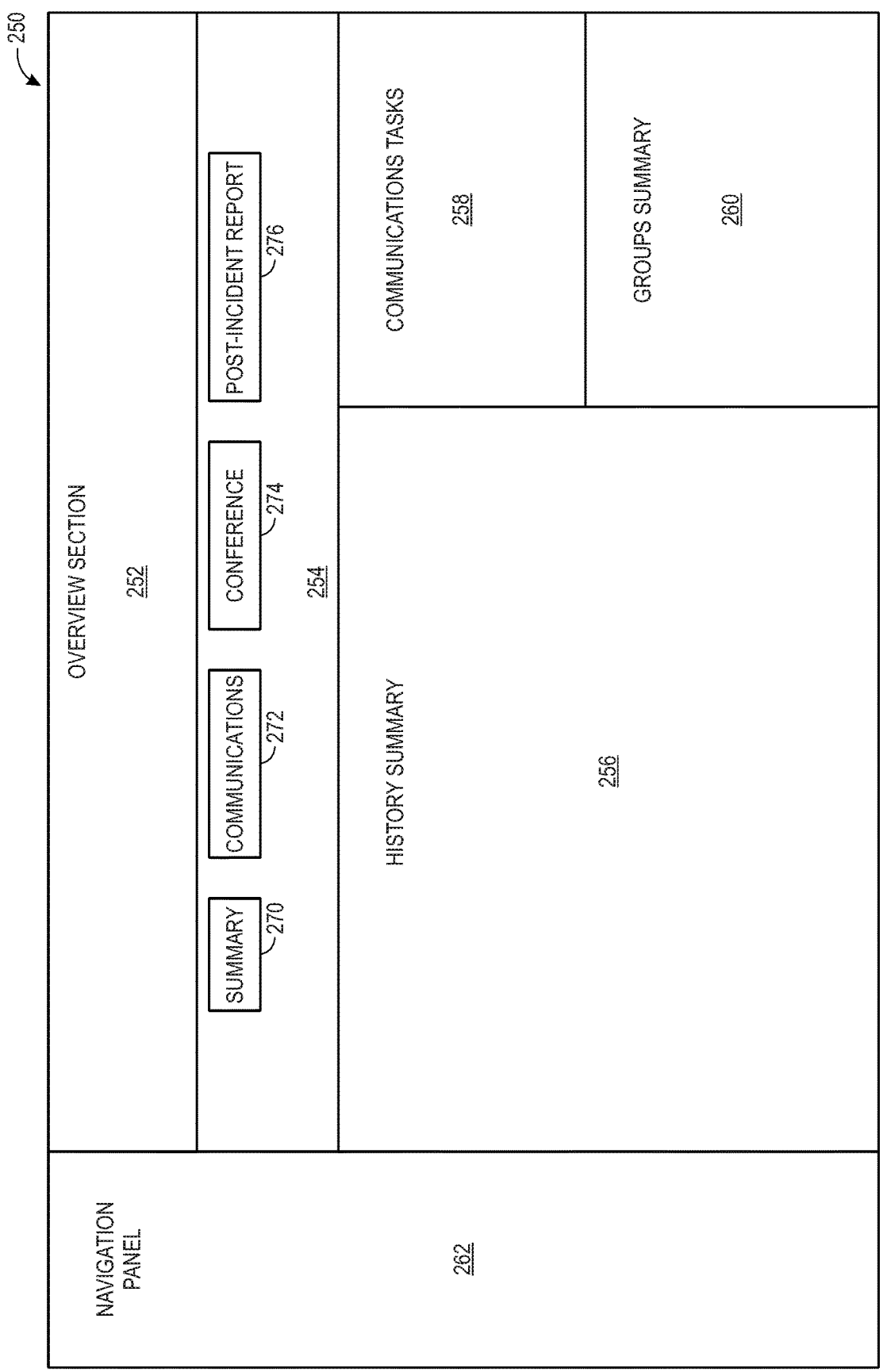
FIG. 5 is an embodiment of the general sections of a unified incident management window used for tracking progress associated with resolving a major incident, in accordance with aspects of the present approach.

FIG. 5 is an example of the general sections of a unified incident management window 250 used for tracking progress associated with resolving a major incident 226. The user interface may, in one embodiment, present the unified incident management window 250 as a browser window. Accordingly, the depicted embodiment of the general sections of the unified incident management window 250 is presented as a view of a screen or display illustrating one possible arrangement of various features on a display of a computing device. However, the arrangement of the various features, organized into specific section, is not limited to the embodiment depicted, since the various features can occupy other positions on the display of the computing device. Accordingly, the illustrated sections may be otherwise positioned on the display. Moreover, it should be noted, that the embodiment depicted in FIG. 5 is meant to introduce the reader to the different possible sections (e.g., portions) of the unified management window 250. For example, the depicted unified management window 250 includes an overview section 252, an impact summary section 254, a history summary section 256, a communication tasks section 258, a groups summary section 260, and a navigation panel 262.

In one embodiment, the overview section 252 may provide a support personnel with a high level overview of the major incident 226 submitted by the client. For example, the overview section 252 may provide a status identifier for the incident 222 submitted by the client, such that the status identifier indicates whether the incident 222 is a major incident candidate 224, a major incident 226 (e.g., new 228, in progress 230, or resolved 232), or closed 234. The overview section 252 may also include a status changing selectable prompt, such that the status changing selectable prompt may enable the support personnel to change the status of the incident 222 from a major incident candidate 224 to a major incident 226 that is new 228, in progress 230, or resolved 232.

The impact summary section 254 may enable the support personnel to select between a summary feature 270, a communications feature 272, a conference feature 274, and a post-incident report 276, as described in detail below. It should be noted that the summary feature 270, the communications feature 272, the conference feature 274, and the post-incident report 276 may each be selected from the same screen of the unified incident management window 250, such as via a tabbed navigation feature. In one embodiment, the summary feature 270 presents the support personnel with an overview of the incident 222. For example, the summary feature 270 may include an overview of one or more of the services impacted by the incident 222, the configuration items (CIs) affected by the incident 222, the outages resulting from the incident 222, the locations impacted by the incident 222, the child incidents, among other information, as discussed in detail below. Furthermore, the communications feature 272, when selected, may present configuration and implementation features for issuing communications or message related to the major incident 226. The conference feature 274, when selected, may enable a support personnel to initiate or manage one or more conference calls and/or participate in the conference with technical personnel (e.g., to resolve 232 a major incident 226). The post-incident report 276 provides information associated with a major incident 226 after it has been resolved 232, such as for a post-mortem review or analysis. For example, the post-incident report 276 may be reviewed and updated during a designated review process before being shared by stakeholder. In some instances, the post-incident report 276 includes a record of actions preformed, the reasons for performing those actions, and the findings resulting from the actions performed.

The history summary section 256 may include activities and work notes posted by support personnel working on resolving a major incident 226. The activities and work notes may be presented in chronological order (e.g., the most recent activities and work notes above the older activities and work notes) or reverse chronological order. In addition, the history summary section 256 may enable the support personnel to post a new work or activity note. Further, the history summary section 256 may enable the customer support personnel to review open and completed communication tasks. For example, a support personnel may view a communication plan, in which periodic messages were sent to certain recipients.

The communication tasks section 258 may provide an option to view prior, current, or pending communication tasks and/or to view conference calls (e.g., with other technical personnel). The communication tasks section 258 may further enable the support personnel to initiate and manage communication tasks with certain personnel. The groups summary section 260 may present a list of the active groups and the members (e.g., technical personnel) of those groups working to resolve 232 the incident 222. The groups summary section may be divided into active groups (e.g., the groups currently logged on and trying to resolve the incident 222) and on-call groups (e.g., groups that may be contacted at any time for assistance), such that the support personnel may select, via the unified interface, between the active groups and the on-call groups.

The navigation panel 262 may present the support personnel with a variety of selectable options to facilitate navigating through the unified incident management window 250. For example, the navigation panel 262 may enable the support personnel to access the major incident candidates 224, the major incidents 226, and the resolved 232 or closed 234 major incidents 226. Further, the navigation panel 262 may enable the support personnel to access various reports, services, and the like.

Figure 6:
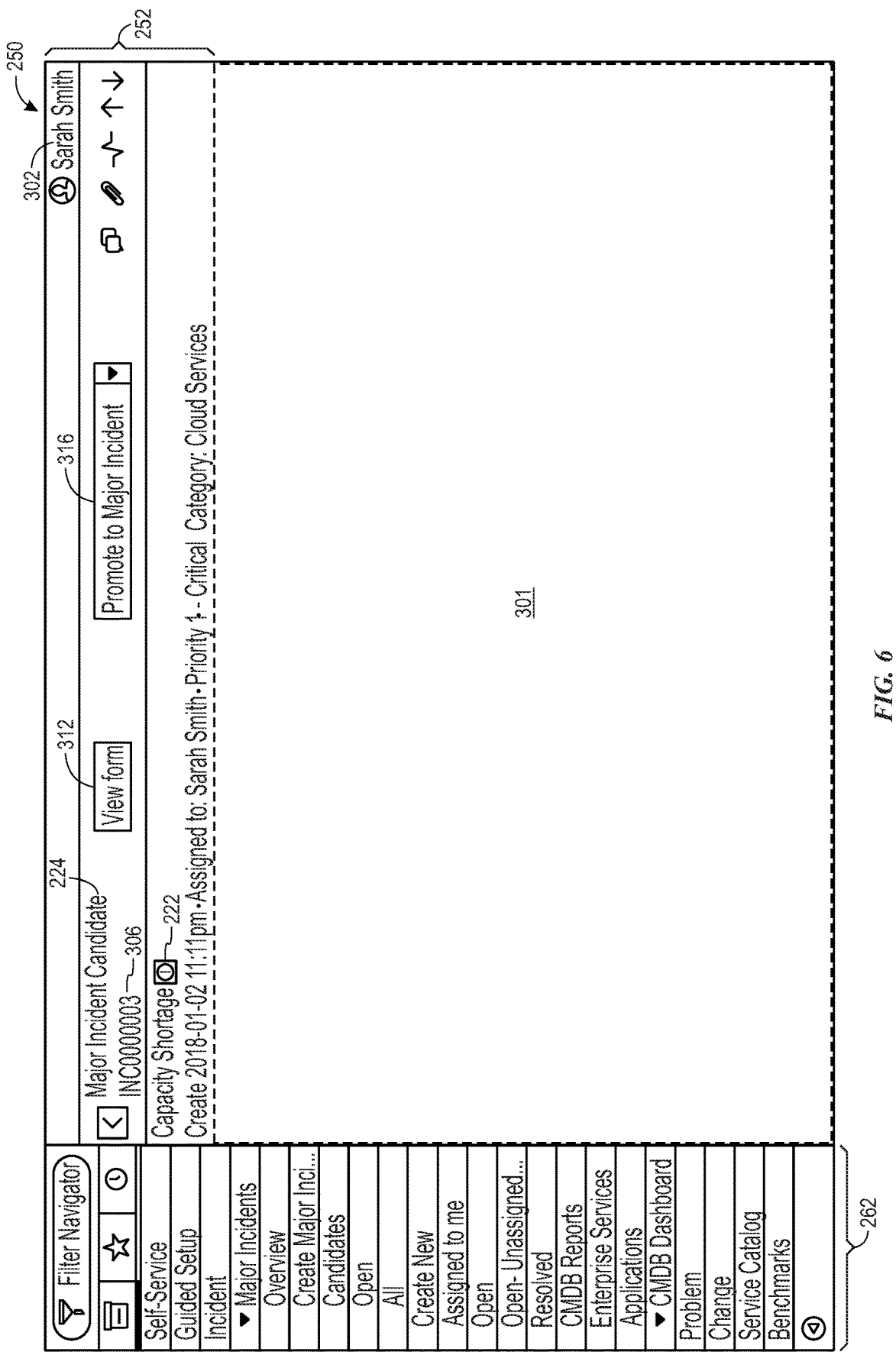
FIG. 6 is an embodiment of the overview section and the navigation panel of the unified incident management window of FIG. 5, in accordance with aspects of the present approach.

FIG. 6 is an embodiment of the overview section 252 and the navigation panel 262 of the unified incident management window 250 of FIG. 5. To facilitate discussion, the impact summary section 254, the history summary section 256, the communication tasks section 258, and the groups summary section 260 of the unified incident management window 250 are discussed in greater detail in later figures but are omitted in FIG. 6 to simplify the presented material. With the preceding in mind, a support personnel 302 (e.g., "Sarah Smith" in this example) may be logged into the unified incident management window 250. In some instances, the support personnel 302 may be required to provide login credentials (e.g., a password) to access the unified incident management window 250.

The depicted unified incident management window 250 also includes an overview section 252 that includes an incident number 306, in this example, "INC000003," associated with an incident 222. In the depicted embodiment, the overview section 252 further includes a prompt 316 to promote (the major incident candidate 224) to a major incident 226 or to designate the major incident 226 as new 228, in progress 230, and/or resolved 232. Furthermore, the overview section 252 may include a brief description of the incident 222 to be resolved, as submitted by the clients. The incident 222, in this example "Capacity Storage," and associated information may be depicted on the overview section 252. For example, the information associated with the incident 222 may include the date and time created (e.g., "Created: Jan. 2, 2018; 11:11 pm"), the support personnel (e.g., "Assigned to Sarah Smith") assigned the incident 222, a level of priority (e.g., Priority 1), severity of the incident 222 (e.g., Critical), the relevant category (e.g., Cloud Services), or any combination thereof, among other associated information.

The overview section 252 may also include a search option, such that the logged in support personnel 302, may search for certain characters (e.g., text) on the unified incident management window 250. Additionally, the overview section 252 may enable the support personnel 302 to initiate an instant message (IM); for example, with another support personnel. In addition, the overview section 252 may enable the support personnel 302 to access a frequently asked (FAQs) tab, for example, to provide assistance in navigating the unified incident management window 250. Furthermore, the overview section 252 may enable the support personnel 302 to access system preferences, such that the support personnel 302 may edit certain aspects of their profile, such as their contact information, password, and the like, within the unified incident management window 250. Although in the depicted embodiment, the overview section 252 is positioned at the top of the unified incident management window 250, it should be noted that the overview section 252 and any of its prompts may be positioned at any suitable location on the unified incident management window 250 (e.g., at the middle, at the bottom, at a corner). Furthermore, additional prompts may be included in the overview section 252, and certain prompts discussed above may be omitted from the unified incident management window 250.

The unified incident management window 250 may include the navigation panel 262, which may present the support personnel 302 with a variety of selectable options. For example, the navigation panel 262 may include selectable options that may enable the support personnel 302 to access a list of major incident candidates 224, a list of major incidents 226, and a list of resolved major incidents 226. Further, the navigation panel 262 may enable the support personnel 302 to access various reports, services, applications, or other features to facilitate resolving the incident 222.

Figure 7:
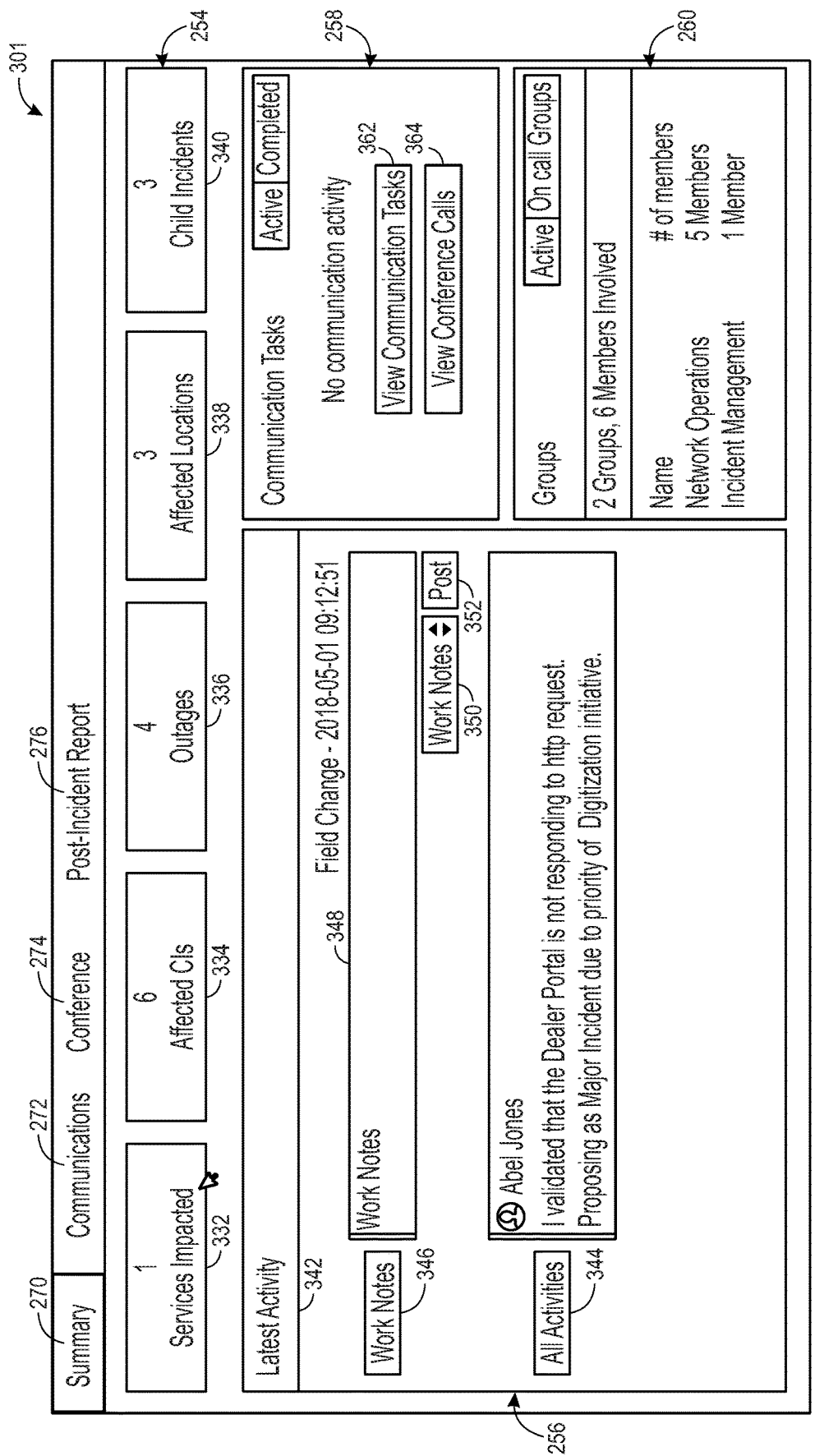
FIG. 7 is an embodiment of a portion of the unified incident management window of FIG. 5 when a summary feature is selected, in accordance with aspects of the present approach.

Turning to FIG. 7, the remaining portions of one implementation of the unified incident management window 250 are depicted. In this example, an embodiment of a portion of the unified incident management window 250 is shown when the summary feature 270 is selected. In some instances, when the support personnel accesses (e.g., or logs into) the unified incident management window 250, the support personnel may be presented with the summary feature 270 pre-selected. The summary feature 270 may be included in a box, as depicted, to indicate that the summary feature 270 is selected and that summary feature information is being presented. However, it should be noted that any suitable visual indication (e.g., underlined, font change, highlighted) may be used to indicate that the summary feature 270 is selected. The summary feature 270 may present an overview of the major incident candidate 224 in the impact summary section 254. For example, the summary feature 270, when selected, may present the impact summary section 254, which includes the number of impacted services 332 (e.g., one), the number of affected CIs 334 (e.g., six), the number of outages 336 (e.g., four), the number of locations impacted 338 (e.g., three), and the number of child incidents 340 (e.g., three).

Furthermore, when the summary feature 270 is selected, the unified incident management window 250 may include latest activity 342 in the history summary section 256. As illustrated, the history summary section 256 may include "All Activities" 344 or "Work Notes" 346. For example, in the depicted embodiment, the latest activity 342 includes one work note from Abel Jones, such that the work note from Abel Jones provides a brief description (e.g., "I validated that the Portal is not responding to http requests. Proposing as incident due to priority of initiative") and a time stamp (e.g., 2018-04-01 09:12:51) at which the work note from Abel Jones was generated. Additionally, when the summary feature 270 is selected, the unified incident management window 250 may enable the support personnel to post a new work note by inputting a brief description into the work note prompt 348, scrolling through the drop-down menu 350 to designate the new post as "Work Notes" 346.

Additionally, when the summary feature 270 is selected, the unified incident management window 250 may include the communication tasks section 258, which may present the support personnel a selectable view communication tasks tab 362 and a selectable view conference calls tab 364. In response to the support personnel selecting the selectable view communication tasks tab 362, the unified incident management window 250 may present the support personnel with the communication tasks associated with the incident, as described below. In response to the support personnel selecting the selectable view conference calls tab 364, the unified incident management window 250 may allow the support personnel to initiate or manage conference calls with technical personnel tasked with resolving the major incident 226, as described below. It should be noted that the unified incident management window 250 may also enable the support personnel 302 to access the communications tasks by selecting the communications feature 272.

Additionally, when the summary feature 270 is selected, the unified incident management window 250 may include the groups summary section 260. In this example, the groups summary section 260 includes the groups (e.g., two groups) and members (e.g., six members) of those groups involved in attempting to resolve the incident 222. In some instances, the groups summary section 260 includes the names of the groups and the number of member assigned to each of the groups. In this example, the groups summary section 260 may include that a first group named "Network Operations" includes five members and a second group named "Incident Management" includes one member. Furthermore, the groups summary section 260 may be divided into active groups (e.g., the groups currently logged on and trying to resolve the incident 222) and on-call groups (e.g., groups that may be contacted at any time).

FIG. 8 is an embodiment of another portion of the unified incident management window 250 of FIG. 5 when the summary feature 270 of FIG. 7 is selected. Furthermore, the embodiment depicted in FIG. 8 may be presented via the unified incident management window 250 when the support personnel scrolls down from the embodiment of FIG. 7. As illustrated, the summary feature, when selected may provide more information associated with the impacted services 332. For example, the information associated with the impacted services may include the number of impacted services (e.g., one) the name of each of the impacted services (e.g., the Dealer Portal), and/or an owner of the impacted service (e.g., James Greene), among other suitable data.

In addition, the summary feature 270, when selected, may provide more information associated with the affected CIs 334. For example, the information associated with the affected CIs 334 may include the number (e.g., six) of affected CIs 334, a name (e.g., "DP WEB14") of each of the affected CIs 334, the support group (e.g., "Data ops," "Net ops," "Netops") of each of the affected CIs 334, who owns (e.g., Jon James) each of the affected CIs 334, or any combination thereof, among other suitable information associated with the affected CIs 334. In certain embodiments, the information associated with the affected CIs may be presented in a new window. In some embodiments, the information associated with the affected CIs 334 may be customizable, such that the user may remove the information associated with the affected Cis 334 from the list.

The summary feature 270, when selected, may provide more information associated with the outages 336 resulting from the major incident 226 or major incident candidate 224. For example, the information associated with the outages 336 may include the number (e.g., four) of outages 336, a CI of each of the outages 336, a type of outage for each of the outages 336, a start and end time associated with each of the outages 336, or any combination thereof, among other information associated with the outages 336. The start time and end time of each of the outages may include the second, minute, hour, day, month, year, or any combination thereof for the start time and end time associated with each of the outages. In some embodiments, the support personnel may customize (e.g., add, remove, etc.) the information associated with the outages 336. In some instances, outages that have not ended may not include an end time, and alternatively, may be labeled as "in existence." The unified incident management window 250 may enable the support personnel to create or add a new outage 336, such that the new outage 336 is displayed on the unified incident management window 250 after being created or added.

The summary feature 270, when selected, may provide more information associated with the affected location 338 resulting from the major incident candidate 224. For example, the information associated with the affected locations 338 may include the number (e.g., three) of affected locations 338, a name (e.g., building number) of each of the affected locations 338, an address (e.g., street address) of each of the affected locations 338, a city (e.g., Madrid) of each of the affected locations 338, a country of each of the affected locations (e.g., Spain), or any combination thereof, among others. The unified incident management window 250 may enable the support personnel to create or add a new affected location 338, such that the new affected location 338 is displayed on the unified incident management window 250 after being created or added.

The summary feature 270, when selected, may provide more information associated with the child incidents 340 resulting from the major incident 226. For example, the information associated with the child incidents 340 may include the number (e.g., three) of child incidents 340, an incident number (e.g., INC0000007) of each of the child incidents 340, a short description of each of the child incidents 340, the caller who reported each of the child incidents 340, or any combination thereof, among others. The unified incident management window 250 may enable the support personnel to create or add a new child incident 340, such that the new child incident 340 is displayed on the unified incident management window 250 after being created or added.

The summary feature 270, when selected, may provide incident tasks 366 associated with the major incident 226. The incident tasks 366 assigns various agenda items (e.g., tasks) targeted at resolving the incident 222 to various technical personnel after the major incident candidate 224 is promoted to a major incident 226. As illustrated, the unified incident management window 250 does not include any incident tasks 366, for example, because the major incident candidate 224 has not been promoted to a major incident 226 at the time for which the screen is depicted. The unified incident management window 250 may enable the support personnel to create or add an incident task 366, such that the new incident task 366 is displayed on the unified incident management window 250 after being created or added.

The unified incident management window 250 enables the support personnel to promote the major incident candidate 224 to a major incident 226. For example, the support personnel may select the prompt 316 illustrated in FIG. 6 to change the incident 222 from a major incident candidate 224 to a major incident 226. After the incident 222 is promoted from a major incident candidate 224 to a major incident 226, the incident tasks 366 may automatically propagate and assign agenda items (e.g., tasks) targeted at resolving the major incident 226.

FIG. 9 is an embodiment of a portion of the unified incident management window 250 of FIG. 5 in which the incident 222 of FIG. 3 is marked as a major incident 226. After the incident 222 is promoted from a major incident candidate 224 to a major incident 226, the incident tasks 366 may automatically propagate and assign agenda items (e.g., incident tasks) targeted at resolving the incident 222. Alternatively or in addition, the incident tasks 366 may be manually created or manually added by the support personnel. For example, the support personnel may create the incident task 366, including an automatically generated task number (e.g., TSK0001001), a short description (e.g., "Run network diagnostic," "Review and update team on results," etc.) of the incident task 366, and a corresponding person assigned to the incident task 366. However, it should be noted that in some instances, the task number, the short description, the person assigned to the incident task 366, or any combination thereof, may be automatically generated by one or more processor-implemented routines supporting or implementing the interface.

Figure 10:
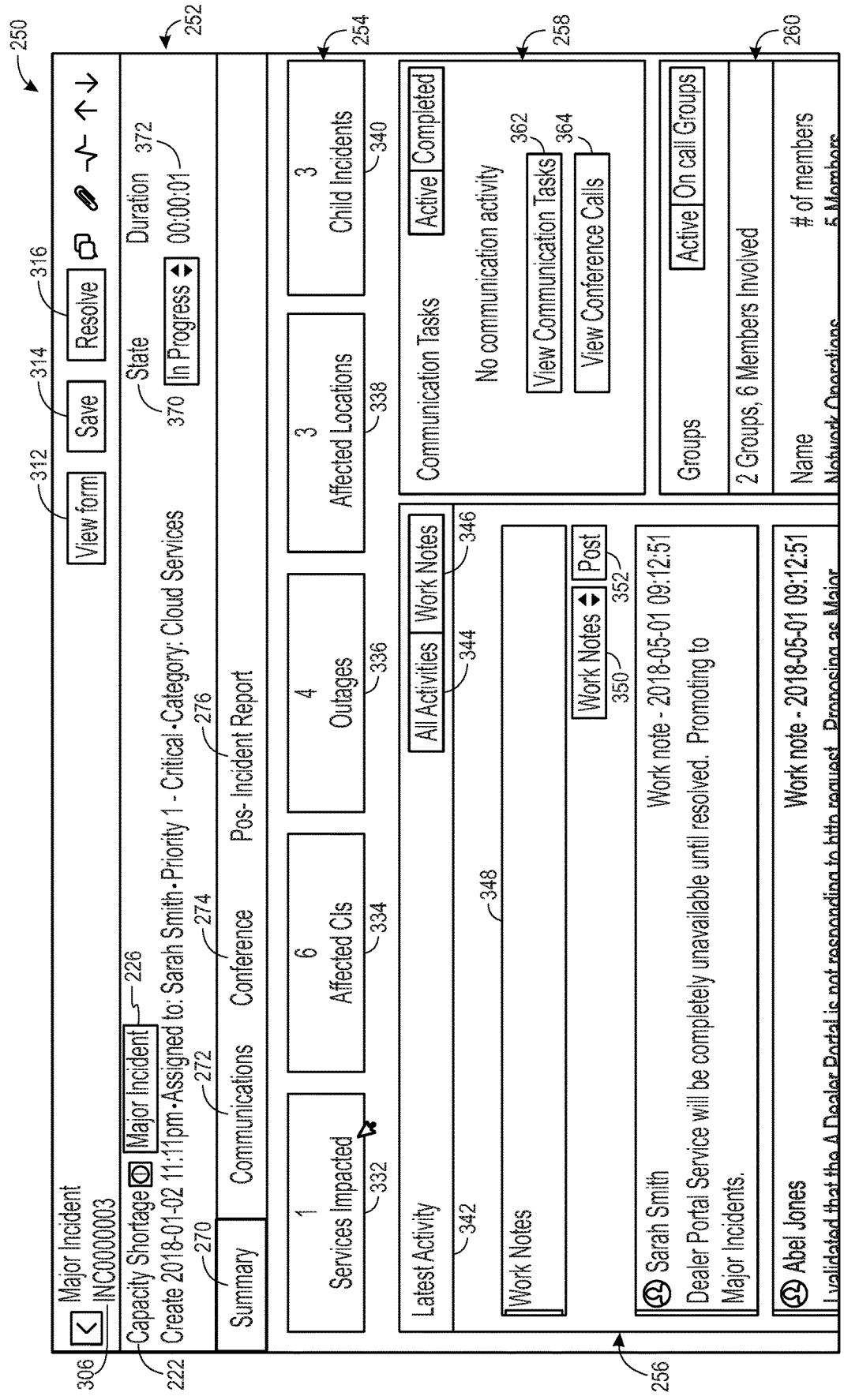
FIG. 10 is an embodiment of another portion of the unified incident management window of FIG. 5, whereby the incident of FIG. 4 is marked as a major incident, in accordance with aspects of the present approach.

FIG. 10 is an embodiment of another portion of the unified incident management window 250 of FIG. 5 in which an incident 222 is marked as a major incident 226. As illustrated, the incident 222, in this example, identified as "Capacity Shortage," is promoted to a major incident 226, as indicated by the block of the major incident 226 next to the name of the issue. In addition, after the incident 222 is promoted to a major incident 226, the overview section 252 may also include the state 370 of the major incident 226. In this example, the state may be "In Progress," 230 because the major incident 226 is being worked on toward resolution. While the major incident 226 is being worked on, a clock 372 may track the duration from when the incident 222 was first reported and/or the duration during which the major incident 226 has been worked on. By clicking the prompt 316, the major incident 226 may be marked as resolved.

FIG. 11 is an embodiment of a portion of the unified incident management window 250 of FIG. 5 in which the communications feature 272 (e.g., a communications tab) is selected. The top portion of the unified incident management window has been omitted from the illustrated embodiment to facilitate discussion. However, it should be noted that the top portion (e.g., along with the clock 372 of FIG. 10) and the illustrated portion may be presented, along with the features illustrated in FIG. 11, to the support personnel, for example, when the support personnel selects the communications feature 272. With the following in mind, the depicted unified incident management window 250 presents the communication tasks section 258, as illustrated, when the communications feature 272 is selected.

The communication tasks section 258 may present communication updates to be provided to the public and/or clients. In this example, various technical communication items 380 and various organizational communication items 382 are depicted. In some instances, the technical communication items 380 and the communication items 382 may be separated, as illustrated. The technical communication items 380 refers to communications of a technical nature or content or with technical stakeholders impacted by the major incident 226. The organization communication items 382 refers to communications of an organizational or commercial nature and/or with organization stakeholders or customers impacted by the incident 222. In the illustrated embodiment, the technical communication items 380 include three communication updates (e.g., "Initial Technical Update," "Technical Status Update," and "Technical Resolution Update") while the organization communications items 382 include two communication updates (e.g., "Initial Update" and "Status Update." However, it should be noted that the technical communication items 380 and the organization communications items 382 may each include any number of communication updates, and/or the communication items 382 may be different based on an organizational process, user, or company affiliation.

The communication updates may include information regarding a channel 384 through which the communication update is to be transmitted. For example, the channel 384 may include e-mail, short message service (SMS), and the like. The communication updates may include information regarding the status 386 of the communication update. For example, the status 386 may indicate that the communication update is "not started," "completed," and the like. Additionally or alternatively, the communication updates may include a completion indication 388. For example, the completion indication 388 may include a checkmark to indicate that the communication update has been completed, or the completion indication 388 may include a blank circle to indicate that the communication update is not started. Alternatively, the completion indication may include any suitable indication to indicate that the communication update is in progress 230, overdue, pending, and the like. Furthermore, the communication updates may each include a brief description 390. In some instances, the unified incident management window 250 may enable the support personnel to modify or manage the communication updates.

Furthermore, the unified incident management window 250 may display an update specific clock 392, which presents a timer (e.g., "Due in 23:23") for when an update is due. In some instances, the unified incident management window 250 may present the groups summary section 260 and the latest activity 342, when the communications feature 272 is selected. The unified incident management window 250 may also enable the support personnel to add a new communication update by selecting a selectable "add" option.

FIG. 12 is an embodiment of a portion of the unified incident management window 250 of FIG. 5, such that a communication task is added to the communications feature 272 of FIG. 11. When the unified incident management window 250 receives a user input to add a new communication task, the unified incident management window 250 may present the support personnel with an interface (e.g., the screenshot 400) of the unified incident management window 250 depicted in FIG. 11. The depicted screenshot 400 includes a drop-down menu for selecting a communication plan 402. The communication plan 402 may be a new, existing, or expired communication plan. Furthermore, the screenshot 400 includes a text box for entering a plan name 404 (e.g., "Executive Team Communication"). The screenshot 400 further includes a drop-down menu for adding a recipient 406 intended to be associated with this newly generated communication task. For example, the drop-down menu may include options for specifying the recipient 406 to be a user, client, administrator, and the like. The unified incident management window 250 may also include a search or text box for further specifying the name of the recipient (e.g., "John Donahoe"). After the recipient 406 has been added, a recipient list 408 may be propagated. In some instances, the support personnel may search a table of recipients and select certain recipients to propagate the recipient list.

In addition, the screenshot 400 includes a text box for specifying the task name 410, in this example, "Executive Team Status Update." The task name may be presented when the communications feature is selected. In addition, the screenshot 400 includes a textbox for enabling a support personnel to insert a brief task description 412. The screenshot 400 also includes selectable boxes for indicating, which channels 384 will be used to communicate. While the illustrated embodiment includes boxes (e.g., a box specifying email as the channel, another box specifying SMS as the channel, another box specifying slack as the channel, and another box specifying announcements as the channel) that can be checked, it should be noted that a support personnel may specify channels 384 via any suitable method. Furthermore, the screenshot 400 includes options for specifying the frequency 416 for sending the new communication task to the recipients 406 specified in the recipient list 408. In this example, the support personnel may specify whether the new communication task should occur only one time or be recurring (e.g., every 30 minutes or any other suitable period). In this example, after the support personnel selects the save option, the new communication task is generated.

Figure 13:
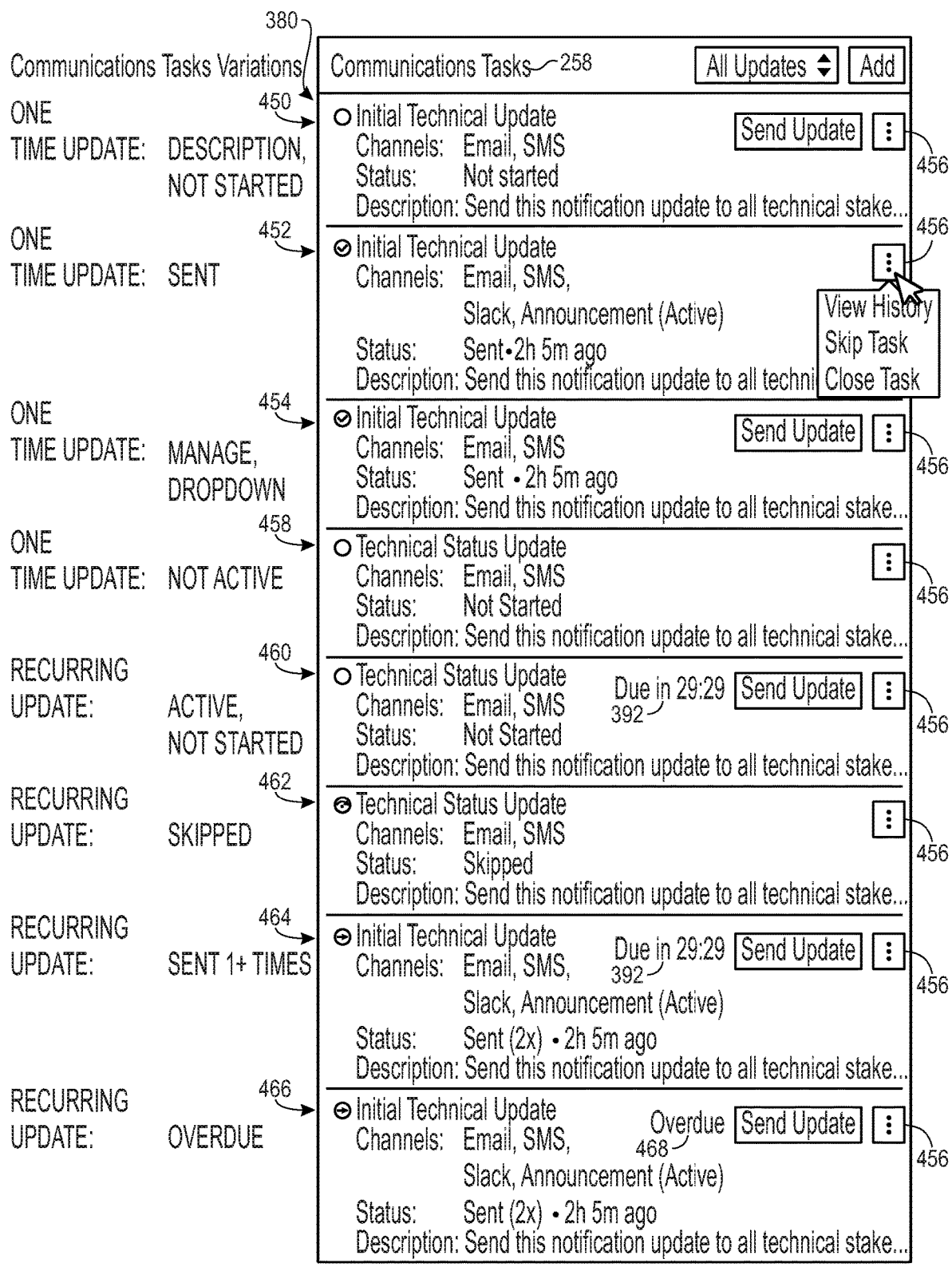
FIG. 13 is an embodiment of the portion of FIG. 11 of the unified incident management window of FIG. 5, whereby the communication task is added to the communication feature, in accordance with aspects of the present approach.

FIG. 13 is an embodiment of the portion of FIG. 11 of the unified incident management window 250 of FIG. 5, such that the communication task is added to the communication feature. In this example, the communication tasks 258 includes a variety of technical communication items 380. Specifically, the unified incident management window 250 include eight different communication updates. However, it should be noted that the communication tasks may include any number of communication updates. With the foregoing in mind, the first communication update 450 may be transmitted through e-mail and SMS channels, includes a status of "not started," and includes a description to clarify a timing and characteristics of the communication update. Accordingly, the first technical communication item 450 is a one-time update that includes a description that has not yet been started. The support personnel may select the "Send" option to update the description to the first technical communication item 450.

The second communication update 452 was transmitted through e-mail, SMS, slack, and active announcement channels, includes a status of "sent," and includes a description to clarify the timing and the characteristics of the communication update. In some instances, when the status of the communication update is designated as "sent," the communication item may include the time (e.g., 2 hours and 5 minutes ago) the communication update was sent. Furthermore, when the communication is sent, a checkmark may be present next to communication update, as shown next to the second communication update 452.

The third communication update 454 was transmitted through e-mail and SMS, includes a status of "sent," and includes a description to clarify the timing and the characteristics of the communication update. In some instances, the unified incident management window 250 may enable the support personnel to select a dropdown menu. The dropdown menu 456 may include a first option to view history, a second option to skip task, a third option to close task, or any combination thereof, among other options. Accordingly, the unified incident management window 250 may enable the support personnel to manage the status of the communication update associated with the dropdown menu 456. Furthermore, when the communication is sent, a checkmark may be present next to communication update, as shown next to the third communication update 454.

The fourth communication update 458 may be transmitted through e-mail and SMS, includes a status of "not started," and includes a description to clarify the timing and the characteristics of the communication update (e.g., "Send every 30 minutes"). In some instances, the communication updates may not be active, such as the fourth communication update 458. Further, the unified incident management window 250 may not enable access of the dropdown menu 456 or selecting the "Send Update" option for inactive communication updates.

The fifth communication update 460 may be transmitted through e-mail and SMS, includes a status of "not started," and includes a description to clarify a timing and characteristics of the communication update (e.g., "Send every 30 minutes"). In some instances, the communication updates may be active, but not started, such as the fifth communication update 460. For example, the fifth communication update 460 may include the update specific clock 392, which presents a timer (e.g., "Due in 29:59") for when an update is due. The unified incident management window 250 may enable access of the dropdown menu 456 and enable the selection of the "Send Update" option. In some instances, the update specific clock 392 may be removed after the status is changed to "sent," as a result of the selection of the "Send Update" option. In some instances, an update, such as the provided example of the fifth communication update 460, may be a recurring update.

The sixth communication update 462 may be transmitted through e-mail and SMS, includes a status of "skipped," and includes a description to clarify a timing and characteristics of the communication update (e.g., "Send every 30 minutes"). In some instances, the status may be changed to "skipped" when the support personnel selects the skip task option in the dropdown menu 456. In some instances, the sixth communication update 462 may be a recurring update that may be skipped upon selection of the skip task option in the dropdown menu 456. Furthermore, when the communication update is skipped, a visual indication may be present next to communication update, as shown next to the sixth communication update 462.

The seventh communication update 464 may be transmitted through e-mail and SMS, includes a status of "sent (2×)," and includes a description to clarify the timing and the characteristics of the communication update (e.g., "Send every 30 minutes"). The status indicator of "sent (2×)," may serve as an indication that the seventh communication update 464 has been sent more than once. The seventh communication update 464 may include the update specific clock 392, which presents a timer (e.g., "Due in 29:59") for when an update is due. The unified incident management window 250 may enable access of the dropdown menu 456 and enable the selection of the "Send Update" option.

Finally, the eighth communication update 466 may be transmitted through e-mail and SMS, includes a status of "sent (2×)," and includes a description to clarify the timing and the characteristics of the communication update. When the communication update has not been sent by the deadline, the communication update may include an overdue indication 468. The unified incident management window 250 may enable access of the dropdown menu 456 and enable the selection of the "Send Update" option, such that when the support personnel sends the update the overdue indication 468 may be removed.

Figure 14:
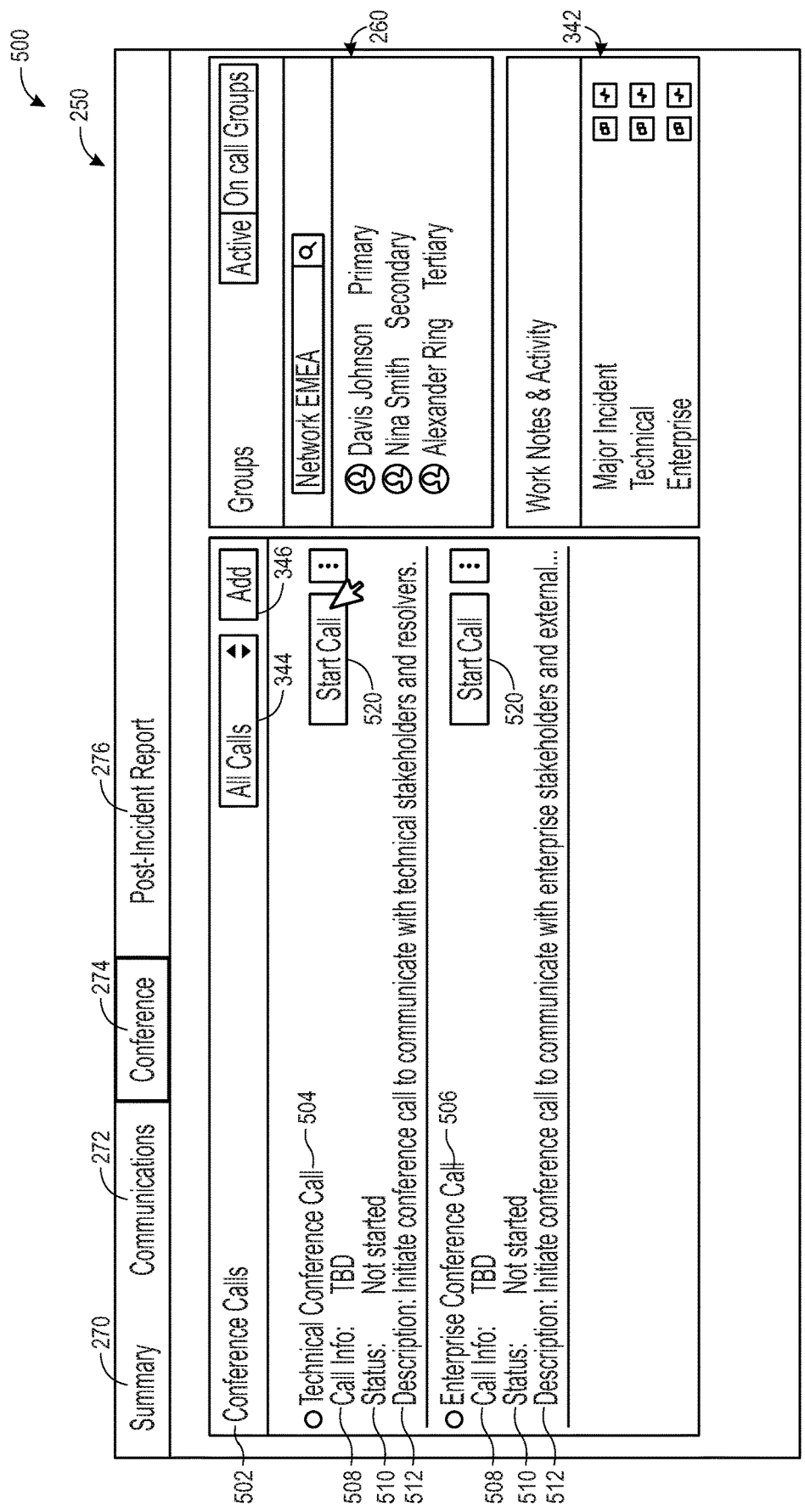
FIG. 14 is an embodiment of a portion of the unified incident management window of FIG. 5 when a conference feature is selected, in accordance with aspects of the present approach.

FIG. 14 is an embodiment of a portion of the unified incident management window 250 of FIG. 5 when the conference feature 274 is selected. When the conference feature 274 is selected, the screenshot 500 may be presented to the support personnel. The conference feature 274 may include information about conference calls 502 between support personnel working to resolve the incident. The conference feature 274 may enable a support personnel to add a new conference call or select from a dropdown menu to select to view certain calls. In some instances, the unified incident management window 250 may present the groups summary section 260 and the latest activity 342, when the conference feature 274 is selected.

In this example, the information about the conference calls 502 includes a technical conference call 504 and an organization or enterprise conference call 506. The technical conference call 504 and the enterprise conference call 506 each include call information 508, a conference call status 510, and a description 512. When the call has not been started, the call information may display "TBD" and the status may display "not started." The unified incident management window 250 may enable the support personnel to start the conference call 502 (e.g., the technical conference call 504 or enterprise conference call 506), for example, by selection the start call option 520.

Figure 15:
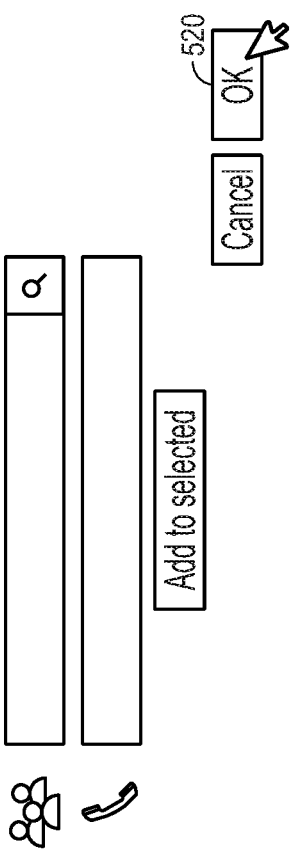
FIG. 15 is an embodiment of a conference call window whereby support personnel may be added to a conference call, in accordance with aspects of the present approach.
Figure 17A:
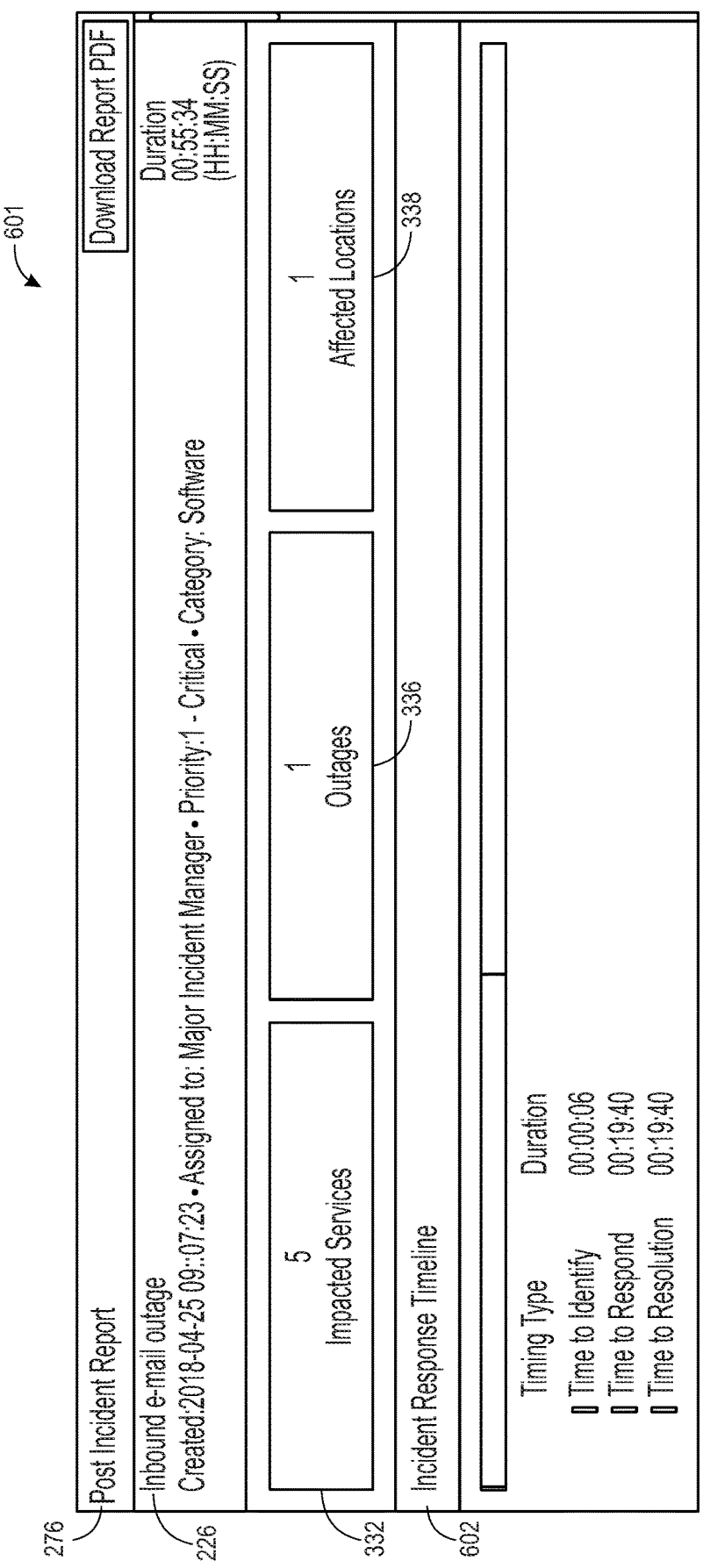
FIG. 17A is an embodiment of a post-incident report window, in accordance with aspects of the present approach.
Figure 17B:
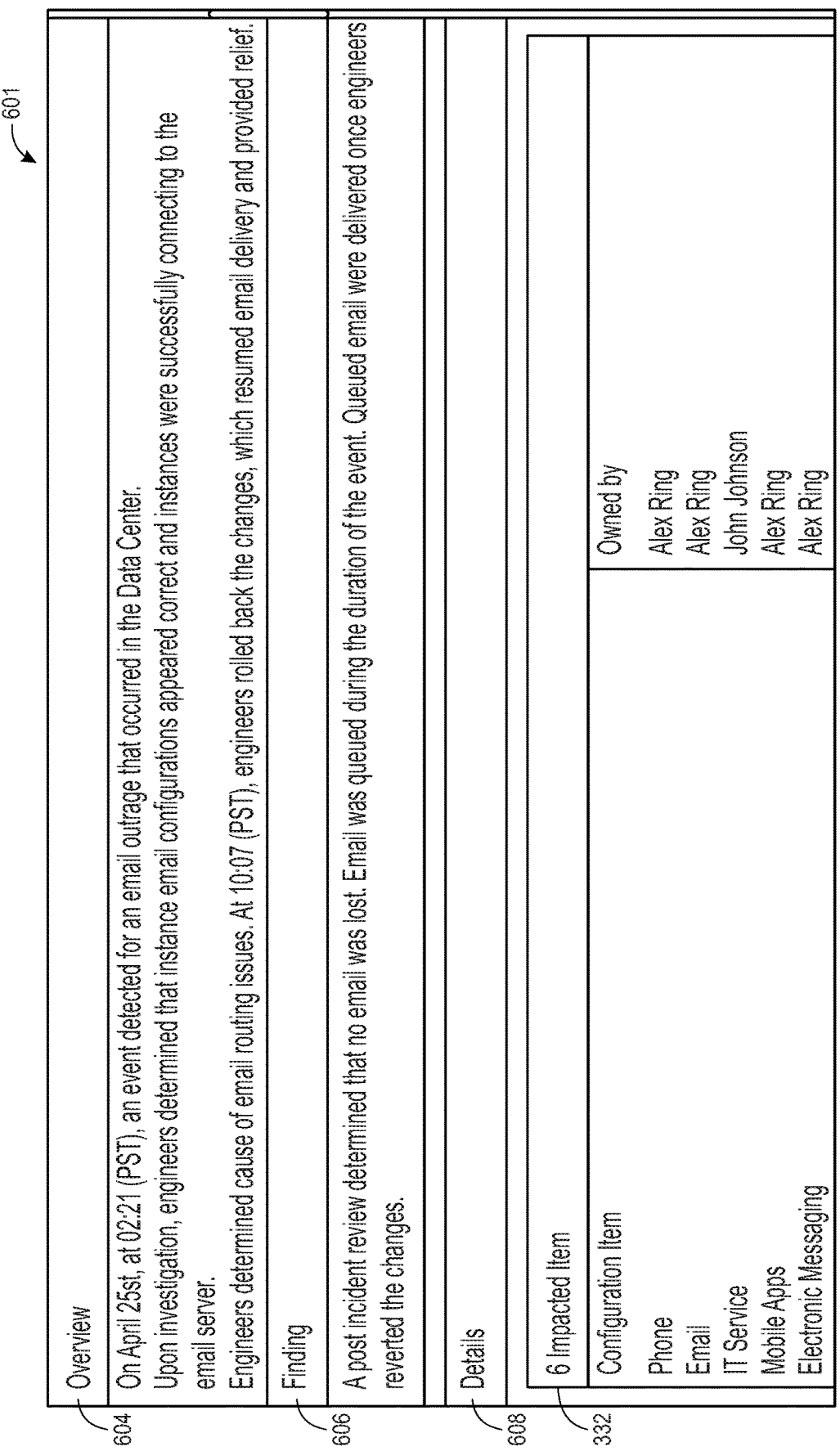
FIG. 17B is an embodiment of a post-incident report window of FIG. 17A, in accordance with aspects of the present approach.

FIG. 15 is an embodiment of a conference call window 550 which enables support personnel or other technical personnel to be added to the conference call 502. For example, the conference call window 550 of the unified incident management window 250 may include a list 552 of recommended participants, which may be transported to the selected list 554. In some instances, the conference call window 550 may include an option for manually selecting participants (e.g., by typing their names into a text box). The unified incident management window 250 may initiate the conference call with the desired participants in the selected list 554 upon selection of the start call option 520.

Figure 16:
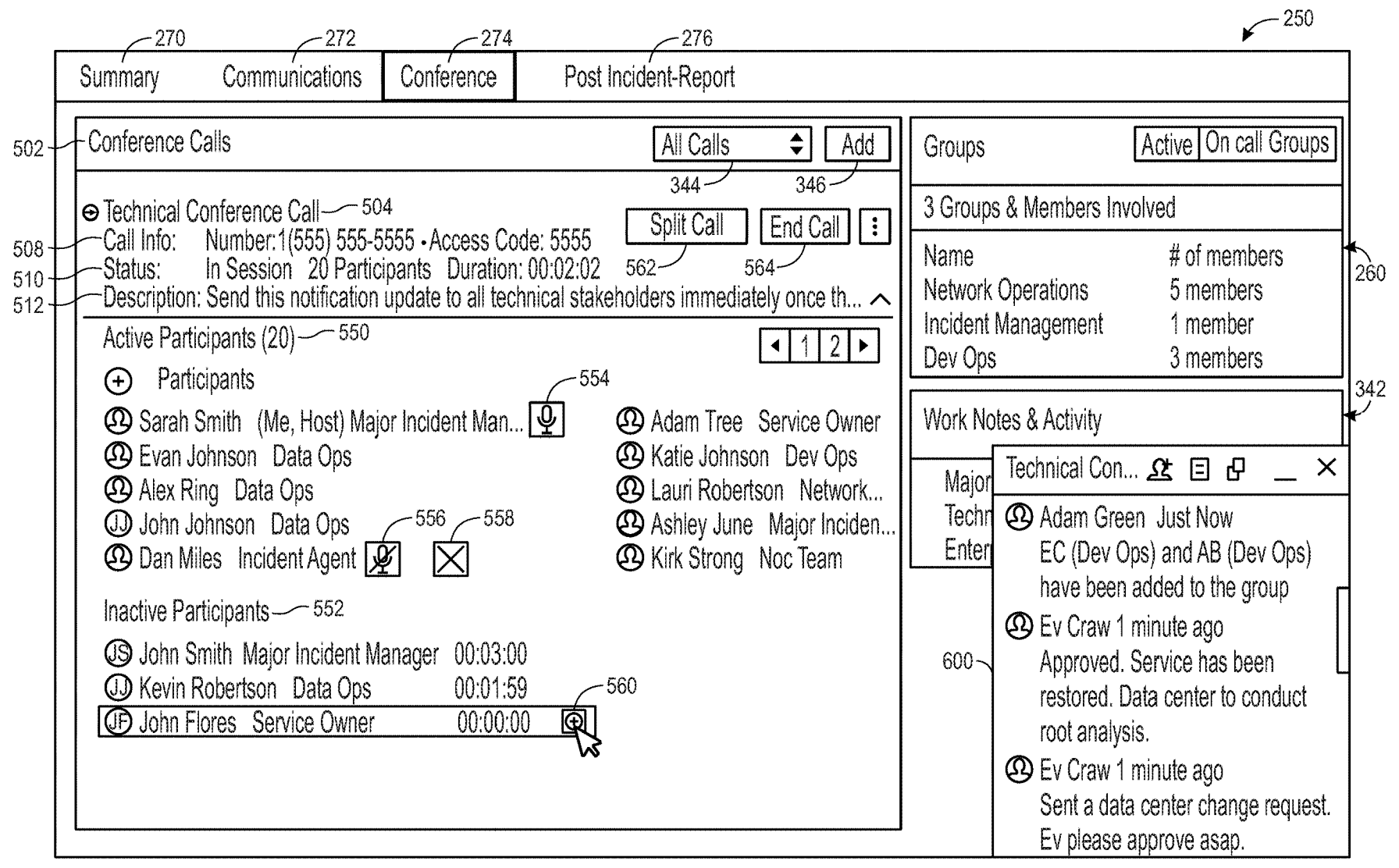

FIG. 16 is an embodiment of a portion of the unified incident management window 250 of FIG. 5, such that the conference call 502 of FIG. 15 is administered and managed. The portion of the unified incident management window 250 depicted in FIG. 16 may be displayed when the conference feature 274 is selected. For example, after the technical conference call 504 has started (e.g., by selection of the start call option), the unified incident management window 250 may display the call information 508 (e.g., the call-in number and the access code), the conference call status 510 (e.g., in session, the number of participants, the duration of the call, etc.), and the description 512 (e.g., "send notification update once the incident has been declared"). The unified incident management window 250 may show the active participants 550 and the number (e.g., twenty) of active participants 550 in the conference call 502. Furthermore, the unified incident management window 250 may show the inactive participants 552 and the number (e.g., three) of active participants 550 in the conference call 502.

In some instances, the unified incident management window 250 may provide an indication 554 referencing who the host of the conference call 502 is. Furthermore, the unified incident management window 250 may enable the host of the conference call or any authorized participant to add other participants. The unified incident management window 250 may further enable the host of the conference call or any authorized participant to mute certain active participants, remove certain active participants, add certain inactive participants, or any combination thereof. For example, the unified incident management window 250 may enable the host or the authorized participant to select a mute indication 556 corresponding to the active participant the host or the authorized participant wishes to mute. Additionally, the unified incident management window 250 may enable the host or authorized participant to select a remove indication 558 corresponding to the active participant the host or the authorized participant wishes to remove. Additionally, the unified incident management window 250 may enable the host or the authorized participant to select an add indication 560 corresponding to the inactive participant the host or the authorized participant wishes to make an active participant, thereby adding the inactive participant to the conference call.

The unified incident management window 250 may enable the host or the authorized participant to split the call or end the call. For example, when the split call option 562 is selected, the host or the authorized participant may split the conference call 502 into different conference calls with different participants. In some instances, the unified incident management window 250 may include a work note window 600, such that the participants may submit work notes associated with resolving the major incident 226. After the major incident 226 is resolved, the support personnel may change the status of the incident 222 from being a major incident 226 to being resolved. In some instances, the support personnel may update the post-incident report 276 with information associated with what modifications were made to resolve the incident 222.

To help illustrated, FIGS. 17A, 17B, 17C, 17D include embodiments of a post-incident report window 601, in accordance with aspects of the present approach. To facilitate discussion, FIGS. 17A-17D are discussed collectively below. The post-incident report window 601 may present support personnel with information associated with modifications resulting in resolution of the incident 222. For example, the post-incident report window 601 may include a title of the major incident 226, in this example, "Inbound e-mail outage." Additionally, the major incident window 601 may include the number of impacted services 332, in this example five; the number of outages 336, in this example one; and the number of affected locations 338, in this example one. It should be understood that the embodiments illustrated in FIGS. 17A, 17B, 17C, 17D may not all fit on the display presenting the post-incident report window, but the content associated with the post-incident report window 601 may be scrollable, such that a user may scroll to navigate to desired content of the post-incident report 276. For example, a user may scroll from the content in the embodiment of FIG. 17A to the content of 17B, 17C, or 17D. To facilitate viewing information in the post-incident report window 601, the post-incident report 276 may be organized as illustrated and as described below.

In some embodiments, the post-incident report window 601 may include an incident report timeline 602 that presents a time associated with actions targeted at resolving the major incident 226, such as the time to identify the cause of the major incident, the time to respond to identification of the cause, the time to resolve the major incident 226, and the like. Furthermore, to the post-incident report window 601 includes an overview 604, which may include a brief description of the post-incident report 276. In some embodiment, the post-incident report window 601 may also present findings 606 associated with the post-incident report 276. In some embodiments, the post-incident report window 601 may include details associated with the number of impacted services 332, in this example five; the number of outages 336, in this example one; and the number of affected locations 338, in this example one.

In some embodiments, as mentioned above, the user may scroll to view and select certain content associated with the post-incident report 276. For example, the user may view (or select) resolution information 610, such as resolution notes 612, related problems 614, and related change requests 616, and related improvement records 618. In some embodiment, the post-incident report window 601 may include a detailed timeline 620 including a list of relevant work notes targeted at resolving the major incident 226.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer-readable medium associated with a cloud-based platform, wherein the non-transitory computer-readable medium comprises computer-readable code, that when executed by one or more processors of a datacenter configured to host a client instance, causes the one or more processors to perform operations comprising:
receiving data indicative of an incident impacting a service associated with the client instance hosted by the datacenter;
recording a date and a time when the incident was reported, a level of priority for the incident, a severity of the incident, and a support personnel assigned to the incident;
tracking a duration of the incident measured from when the incident was first reported, and another duration measured from when the incident has been worked on;
determining that the incident has disrupted information technological capabilities of an enterprise;
elevating a status of the incident to that of a severe incident;
automatically propagating and assigning agenda items targeted at resolving the severe incident;
automatically generating a task number, a short description, and the support personnel assigned to the severe incident;
generating a unified incident management interface based on the data, wherein the unified incident management interface comprises:
a work region; and
a panel separate from the work region, wherein the panel comprises a first selectable feature, a second selectable feature, a third selectable feature, and a fourth selectable feature, selected to cause the one or more processors to present corresponding content on the work region based on the data;
in response to determining that the first selectable feature is selected, generating, on the work region, the corresponding content comprising a summary of at least effects of the severe incident and resolution activity associated with the client instance based on the data;
in response to determining that the second selectable feature is selected, generating, on the work region, the corresponding content comprising selectable communication icons that, when selected, cause the one or more processors to:
create, edit, and administer, respectively, one or more communication tasks associated with one or more client devices that access the client instance; and
provide a communication update on the one or more communication tasks via a communication channel, wherein the communication channel comprises an E-mail service, a short message service, or both;
in response to determining that the third selectable feature is selected, generating, on the work region, the corresponding content comprising selectable conference call icons that, when selected, cause the one or more processors to initiate a conference call with a service agent and split the conference call into different conference calls; and
in response to determining that the fourth selectable feature is selected, generating a post-incident report, comprising: a record of actions, reasons for performing the actions, results from the actions performed, or any combination thereof.

2. The non-transitory computer-readable medium of claim 1, wherein the first selectable feature, the second selectable feature, the third selectable feature, and the fourth selectable feature are each selectable from the panel after the severe incident is resolved.

3. The non-transitory computer-readable of claim 1 wherein the fourth selectable feature, when selected, is configured to receive a note indicative of the severe incident being resolved.

4. The non-transitory computer-readable medium of claim 1, wherein the effects of the severe incident comprise one or more of services impacted by the severe incident, one or more configuration items (Cis) impacted by the severe incident, one or more outages resulting from the severe incident, one or more locations impacted by the severe incident, or one or more child incidents resulting from the severe incident.

5. The non-transitory computer-readable medium of claim 1, wherein the one or more client devices correspond to one or both of a first set of devices in a technical unit or a second set of devices in a non-technical unit.

6. The non-transitory computer-readable medium of claim 1, wherein creating the one or more communication tasks comprises transmitting the one or more communication tasks across a channel to the one or more client devices.

7. The non-transitory computer-readable medium of claim 1, wherein editing the one or more communication tasks comprises editing the status, the short description, or any combination thereof.

8. The non-transitory computer-readable medium of claim 1, wherein initiating the conference call comprises enabling adding an inactive agent to the conference call, removing an active agent from the conference call, muting the active agent from the conference call, or any combination thereof.

9. The non-transitory computer-readable medium of claim 1, comprising a fifth selectable feature that, when selected, is configured to receive an input to change an identification of the severe incident from an incident candidate to a pending incident or a resolved incident.

10. The non-transitory computer-readable medium of claim 1, wherein the first selectable feature, the second selectable feature, and the third selectable feature are selectable and positioned collinearly on the panel.

11. A computer-implemented method, comprising:
receiving, via one or more processors of a datacenter configured to host a client instance, login credentials, wherein the login credentials enable access, via a cloud-based platform implemented at the datacenter, to a unified incident management interface;
receiving, via the one or more processors, data indicative of an incident impacting a service associated with the client instance hosted by the datacenter;
recording, via the one or more processors, a date and a time when the incident was reported, a level of priority for the incident, a severity of the incident, and a support personnel assigned to the incident;
tracking, via the one or more processors, a duration of the incident measured from when the incident was first reported, and another duration measured from when the incident has been worked on;
determining, via the one or more processors, that the incident has disrupted information technological capabilities of an enterprise;
elevating, via the one or more processors, a status of the incident to that of a severe incident;
automatically propagating and assigning, via the one or more processors, agenda items targeted at resolving the severe incident;
automatically generating, via the one or more processors, a task number, a short description, and the support personnel assigned to the severe incident,
generating, via the one or more processors, the unified incident management interface based on the data and upon receipt of login credentials, wherein the unified incident management interface comprises:
a work region; and
a panel separate from the work region, wherein the panel comprises a first selectable feature, a second selectable feature, a third selectable feature, and a fourth selectable feature, selected to cause the one or more processors to present corresponding content on the work region based on the data;
in response to determining that the first selectable feature is selected, automatically generating, on the work region, the corresponding content comprising a summary of at least effects of the severe incident and resolution activity associated with the client instance based on the data;
in response to determining that the second selectable feature is selected, automatically generating, on the work region, the corresponding content comprising selectable communication icons that, when selected, cause the one or more processors to:
create, edit, and administer, respectively, one or more communication tasks associated with one or more client devices that access the client instance; and
provide a communication update on the one or more communication tasks via a communication channel, wherein the communication channel comprises an E-mail service, a short message service, or both;
in response to determining that the third selectable feature is selected, automatically generating, on the work region, the corresponding content comprising selectable conference call icons that, when selected, cause the one or more processors to initiate a conference call with a service agent and split the conference call into different conference calls; and
in response to determining that the fourth selectable feature is selected, generating a post-incident report, comprising: a record of actions, reasons for performing the actions, results from the actions performed, or any combination thereof.

12. The method of claim 11, comprising updating the summary based on the creating, editing, and administering of the one or more communication tasks.

13. The method of claim 11, comprising updating the summary based on executing the conference call.

14. A system, comprising:
one or more non-transitory memory devices of a datacenter implementing a cloud-based platform, wherein the datacenter is configured to host a client instance, wherein the one or more non-transitory memory devices store executable code; and
one or more hardware processors of the datacenter configured to access the executable code and run the client instance, wherein the executable code, when executed by the one or more hardware processors, causes operations to be performed, wherein the operations comprise:
receiving data indicative of an incident impacting a service associated with the client instance hosted by the datacenter;
recording a date and a time when the incident was reported, a level of priority for the incident, a severity of the incident, and a support personnel assigned to the incident;
tracking a duration of the incident measured from when the incident was first reported, and another duration measured from when the incident has been worked on;
determining that the incident has disrupted information technological capabilities of an enterprise;
elevating a status of the incident to that of a severe incident;
automatically propagating and assigning agenda items targeted at resolving the severe incident;
automatically generating a task number, a short description, and the support personnel assigned to the severe incident;
generating a unified incident management interface based on the data, wherein the unified incident management interface comprises:
a work region; and
a panel separate from the work region, wherein the panel comprises a first selectable feature, a second selectable feature, a third selectable feature, and a fourth selectable feature, selected to cause the one or more hardware processors to present corresponding content on the work region based on the data;
in response to determining that the first selectable feature is selected, generating, on the work region, the corresponding content comprising a summary of at least effects of the severe incident and resolution activity associated with the client instance based on the data;
in response to determining that the second selectable feature is selected, generating, on the work region, the corresponding content comprising selectable communication icons that, when selected, cause the one or more hardware processors to:
create, edit, and administer, respectively, one or more communication tasks associated with one or more client devices that access the client instance; and
provide a communication update on the one or more communication tasks via a communication channel, wherein the communication channel comprises an E-mail service, a short message service, or both,
in response to determining that the third selectable feature is selected, generating, on the work region, the corresponding content comprising selectable conference call icons that, when selected, cause the one or more hardware processors to a conference call with a service agent and split the conference call into different conference calls; and
in response to determining that the fourth selectable feature is selected, generating a post-incident report, comprising: a record of actions, reasons for performing the actions, results from the actions performed, or any combination thereof.

15. The system of claim 14, wherein the first selectable feature, the second selectable feature, the third selectable feature, and the fourth selectable feature are each selectable from the panel after the severe incident is resolved.

16. The system of claim 14, comprising a fifth selectable feature that, when selected, is configured to receive an input to change an identification of the severe incident from an incident candidate to a pending incident or a resolved incident.

17. The system of claim 14, wherein the effects of the severe incident comprise one or more of services impacted by the severe incident, one or more configuration items (CIs) impacted by the severe incident, one or more outages resulting from the severe incident, one or more locations impacted by the severe incident, or one or more child incidents resulting from the severe incident.

* * * * *